United States Patent
Yue et al.

(10) Patent No.: US 9,148,818 B2
(45) Date of Patent: Sep. 29, 2015

(54) COORDINATED MULTIPLE POINT TRANSMISSION AND RECEPTION

(71) Applicant: NEC Laboratories America, Inc., Princeton, NJ (US)

(72) Inventors: Guosen Yue, Plainsboro, NJ (US); Narayan Prasad, Wyncote, PA (US); Meilong Jiang, Plainsboro, NJ (US); Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 161 days.

(21) Appl. No.: 13/749,869

(22) Filed: Jan. 25, 2013

(65) Prior Publication Data
US 2013/0229992 A1 Sep. 5, 2013

Related U.S. Application Data

(60) Provisional application No. 61/591,602, filed on Jan. 27, 2012, provisional application No. 61/612,221, filed on Mar. 16, 2012, provisional application No. 61/644,568, filed on May 9, 2012.

(51) Int. Cl.
| | |
|---|---|
| *H04W 4/00* | (2009.01) |
| *H04W 28/04* | (2009.01) |
| *H04B 7/02* | (2006.01) |
| *H04B 7/04* | (2006.01) |
| *H04L 5/00* | (2006.01) |

(52) U.S. Cl.
CPC ............. *H04W 28/044* (2013.01); *H04B 7/024* (2013.01); *H04B 7/0486* (2013.01); *H04L 5/001* (2013.01); *H04L 5/0035* (2013.01); *H04L 5/0044* (2013.01); *H04L 5/0051* (2013.01)

(58) Field of Classification Search
None
See application file for complete search history.

(56) References Cited

U.S. PATENT DOCUMENTS

| | | | |
|---|---|---|---|
| 2010/0220651 A1 | 9/2010 | Chen et al. | |
| 2011/0199986 A1* | 8/2011 | Fong et al. | 370/329 |
| 2011/0235608 A1 | 9/2011 | Koo et al. | |
| 2011/0237270 A1 | 9/2011 | Noh et al. | |
| 2012/0257515 A1* | 10/2012 | Hugl et al. | 370/252 |

FOREIGN PATENT DOCUMENTS

| | | |
|---|---|---|
| CN | 102149124 A | 8/2011 |
| EP | 2701423 A1 | 2/2014 |
| JP | 2012-235341 A | 11/2012 |
| WO | 2011010904 A2 | 1/2011 |
| WO | 2011013989 A2 | 2/2011 |
| WO | 2011/100520 A1 | 8/2011 |
| WO | 2011/106457 A2 | 9/2011 |
| WO | 2011/123764 A2 | 10/2011 |
| WO | 2011/158436 A1 | 12/2011 |

OTHER PUBLICATIONS

3GPP, "Evolved Universal Terrestrial Radio Access (E-UTRA); Physical channels and modulation. TS 36.211 V10.1.0".
NTT DoCoMo, "Investigation of specification impact for Rel. 11 CoMP" 3GPP TSG RAN WG1 R1-112600 Meeting#66, Athens, Greece, Aug. 2011.
3GPP, "Evolved Universal Terrestrial Radio Access (E-UTRA); Physical layer procedures. TS 36.213 V10.1.0".

* cited by examiner

*Primary Examiner* — Kouroush Mohebbi
(74) *Attorney, Agent, or Firm* — Joseph Kolodka; Akitaka Kimura

(57) ABSTRACT

A method implemented in a mobile communications network supporting coordinated multiple point transmission and reception (CoMP) is disclosed. The method includes transmitting, to a user equipment (UE), data in a physical downlink shared channel (PDSCH), and transmitting a reference signal to the UE, wherein a union of resource elements (REs) allocated for reference signals transmitted from a subset of a plurality of transmission points (TPs) in a CoMP set are excluded from resource mapping for transmitting the data to the UE. Other methods, systems, and apparatuses also are disclosed.

11 Claims, 12 Drawing Sheets

US 9,148,818 B2

COORDINATED MULTIPLE POINT TRANSMISSION AND RECEPTION

This application claims the benefit of U.S. Provisional Application No. 61/591,602, entitled "Channel Feedback and Interference Measurement for Coordinated Multiple Point Transmission and Reception," filed on Jan. 27, 2012, U.S. Provisional Application No. 61/612,221, entitled "CSI Feedback and Resource Mapping for Coordinated Multipoint Transmission and Reception," filed on Mar. 16, 2012, and U.S. Provisional Application No. 61/644,568, entitled "CSI Feedback and PDSCH Mapping for Coordinated Multipoint Transmission and Reception," filed on May 9, 2012, the contents of all of which are incorporated herein by reference.

BACKGROUND OF THE INVENTION

The present invention relates to coordinated multiple point transmission and reception (CoMP) and more particularly to channel state information (CSI) feedback and physical downlink shared channel (PDSCH) mapping for CoMP.

We investigate the channel state information (CSI) feedback and the resource mapping for cooperative communication or specifically, coordinated multipoint transmission and reception (CoMP) which is now in discussion for release-11 3GPP standardization. In particular, we first present a CSI feedback framework with better tradeoff between the performance and the feedback overhead. It has been agreed that three CoMP transmission schemes, namely, joint transmission (JT) or joint processing (JP), coordinated scheduling or beamforming (CS/CB), and dynamic point selection (DPS), are supported in the new 3GPP cellular system. To support all possible CoMP transmission schemes, we proposed the CSI feedback schemes based on the size of measurement set which is configured by the network and signalled to the user terminal or user equipment (UE). Then we provide the resource mapping solutions for the problems related to different cell-specific reference signal (CRS) in different cells and consequently the collision between the CRS and the data sent on the physical downlink shared channel (PDSCH). We also address the PDSCH mapping to solve the mismatch of the PDSCH starting points due to the different size of orthogonal frequency division multiplexing (OFDM) symbols allocated for the physical downlink control channel (PDCCH) transmission.

[1] 3GPP, "Evolved Universal Terrestrial Radio Access (E-UTRA); Physical channels and modulation. TS 36.211 V10.1.0".

[2] NTT DoCoMo, "Investigation of specification impact for Rel. 11 CoMP" 3GPP TSG RAN WG1 R1-112600 Meeting #66, Athens, Greece, August 2011.

[3] 3GPP, "Evolved Universal Terrestrial Radio Access (E-UTRA); Physical layer procedures. TS 36.213 V10.1.0".

BRIEF SUMMARY OF THE INVENTION

An objective of the present invention is to solve a collision issue between reference signals and data resource elements (REs) in CoMP.

An aspect of the present invention includes, in a method implemented in a mobile communications network supporting coordinated multiple point transmission and reception (CoMP), transmitting, to a user equipment (UE), data in a physical downlink shared channel (PDSCH), and transmitting a reference signal to the UE, wherein a union of resource elements (REs) allocated for reference signals transmitted from a subset of a plurality of transmission points (TPs) in a CoMP set are excluded from resource mapping for transmitting the data to the UE.

Another aspect of the present invention includes, in a method implemented in a transmission point (TP) supporting coordinated multiple point transmission and reception (CoMP), transmitting, to a user equipment (UE), data in a physical downlink shared channel (PDSCH), and transmitting a reference signal to the UE, wherein a union of resource elements (REs) allocated for reference signals transmitted from a subset of a plurality of transmission points (TPs) in a CoMP set are excluded from resource mapping for transmitting the data to the UE.

Still another aspect of the present invention includes, in a method implemented in a user equipment (UE) supporting coordinated multiple point transmission and reception (CoMP), receiving, from a transmission point, data in a physical downlink shared channel (PDSCH), and receiving a reference signal from the TP, wherein the UE assumes that a subset of a plurality of transmission points (TPs) in a CoMP set transmit reference signals.

Still another aspect of the present invention includes, in a mobile communications network supporting coordinated multiple point transmission and reception (CoMP), a user equipment (UE), and a transmission point (TP) to transmit, to the UE, data in a physical downlink shared channel (PDSCH) and to transmit a reference signal to the UE, wherein a union of resource elements (REs) allocated for reference signals transmitted from a subset of a plurality of transmission points (TPs) in a CoMP set are excluded from resource mapping for transmitting the data to the UE.

Still another aspect of the present invention includes, in a transmission point (TP) supporting coordinated multiple point transmission and reception (CoMP), a first transmission unit to transmit, to a user equipment (UE), data in a physical downlink shared channel (PDSCH), and a second transmission unit to transmit a reference signal to the UE, wherein a union of resource elements (REs) allocated for reference signals transmitted from a subset of a plurality of transmission points (TPs) in a CoMP set are excluded from resource mapping for transmitting the data to the UE.

Still another aspect of the present invention includes, in a user equipment (UE) supporting coordinated multiple point transmission and reception (CoMP), a first reception unit to receive, from a transmission point, data in a physical downlink shared channel (PDSCH), and a first reception unit to receive a reference signal from the TP, wherein the UE assumes that a subset of a plurality of transmission points (TPs) in a CoMP set transmit reference signals.

DETAILED DESCRIPTION

1 System Description

Figure 1:
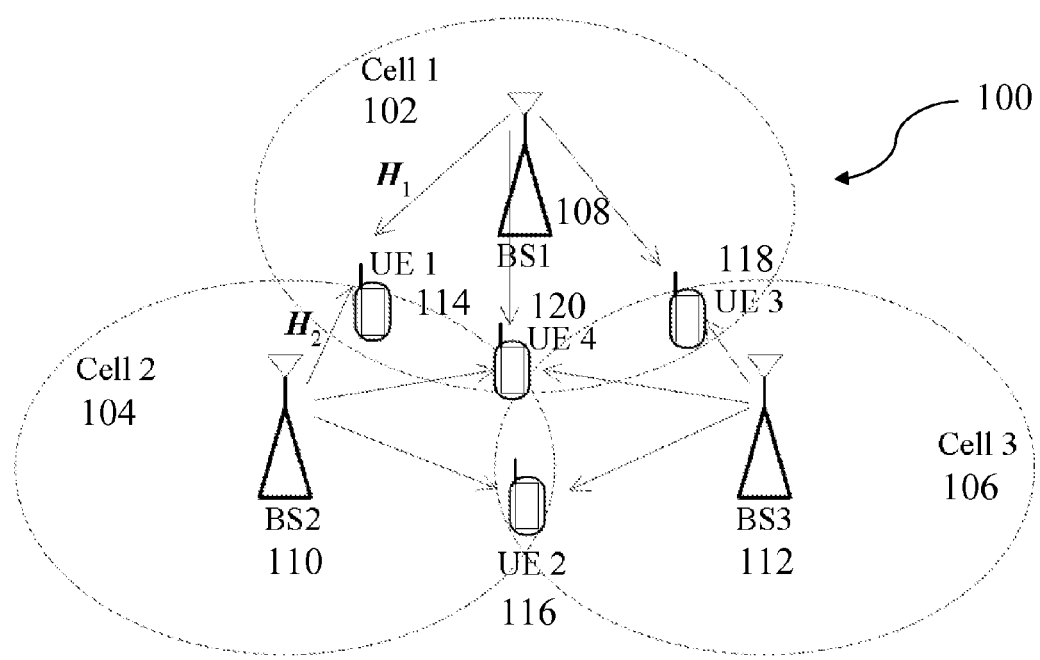
FIG. 1 depicts a homogenous CoMP network with M=3 macrocell BSs.
Figure 2:
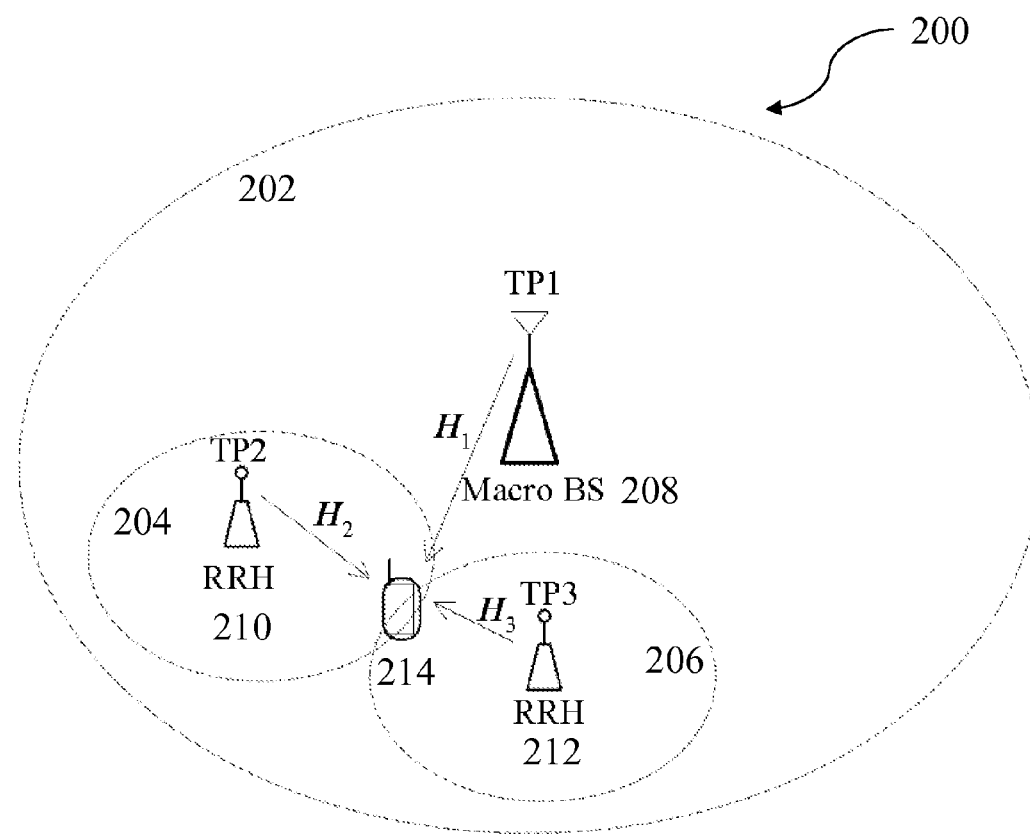
FIG. 2 depicts a heterogenous CoMP network with M=3 macrocell BSs.

We consider a cluster which consists of M transmission points (TPs). Each TP can be either a macro-cell base station (BS) or a low power remote radio head (RRH). Therefore, the CoMP network could be a homogeneous network consisting of all macro-cell BSs, i.e., homogeneous network 100, as shown in FIG. 1 or heterogeneous network (HetNet) 200 which is mixture of macro-cell BSs 208 and lower power RRHs 210 and 212 as shown in FIG. 2. The received signal for the target user equipment (UE) at a resource element (RE) over which data is transmitted to that UE, is given by $$y = \sum_{i=1}^{M} \sqrt{\frac{\rho_i}{r_i}} H_i W_i s_i + \tilde{H}\tilde{W}\tilde{s} + n. \quad (1)$$

where $H_i$, $i=1, \ldots, M$ denotes the channel seen by the UE from the ith transmission point in its CoMP set, where the composition of the latter set is decided in a semi-static manner by the network controller based on long-term signal-to-interference-plus-noise (SINR) ratio measurements and is held fixed across many sub-frames; $\rho_i$ is the transmission power or energy per resource element (EPRE) used by the ith transmission point; $W_i$ and $s_i$ are the precoding matrix (with $r_i$ columns) and the data symbol vector transmitted by the ith transmission point; $\tilde{H}, \tilde{W}$, and $\tilde{s}$ are the composite channel matrix, precoding matrix, and data symbol vector transmitted by all the other transmission points outside the UE's CoMP set. Then, if the UE receives a data stream sent only along the jth layer of the mth transmission point, received SINR corresponding to that stream at the UE is given by $$\gamma_{mj} = \frac{\frac{\rho_m}{r_m} F_{mj}^\dagger H_m W_{mj} W_{mj}^\dagger H_m^\dagger F_{mj}}{F_{mj}^\dagger \left( \frac{\rho_m}{r_m} \sum_{j', j \neq j} H_m W_{mj'} W_{mj'}^\dagger H_m^\dagger + \sum_{i \neq m} \frac{\rho_i}{r_i} H_i W_i W_i^\dagger H_i^\dagger \right) F_{mj} + F_{mj}^\dagger R F_{mj}}, \quad (2)$$

where $F_{mj}$ is the receive filter to retrieve signal $s_{mj}$ from the jth layer of the mth transmission point and R is the covariance of the interference outside CoMP set plus noise, i.e., $R = \tilde{H}\tilde{W}\tilde{W}^\dagger\tilde{H}^\dagger + I$. The corresponding information rate is then $$\eta_{mj} = \log(1 + \gamma_{mj}) \quad (3)$$

Without loss of generality, we assume the transmission point 1 is the serving cell that is supposed to send the data symbols to the UE for conventional single cell transmission (without CoMP) as well as the control signaling and is the TP to which the UE reports its CSI feedback on the uplink channel. Therefore without CoMP, the SINR is $\gamma_{1j}$, $j \in S_1$, where $S_1$ is the set of layers intended for this UE. The total rate for the UE of interest is then given by $\eta_1 = \Sigma_{j \in S_1} \eta_{1j}$. We note that all CSI can be passed to the network controller in a CoMP network which then does the scheduling.

For CS/CB CoMP transmission scheme, the data is still transmitted from the serving cell (or equivalently the anchor cell where the control signalling is received from). Although the SINR is still $\gamma_{1j}$ as given in (2) (with m=1), transmit precoding matrices $W_i$, $i=1, \ldots, M$ are jointly optimized so that the interference from the intra-CoMP set is reduced.

For DPS scheme, based on the CSI feedback from all UEs, the network controller selects the transmission points for each UE so that the weighted sum rate of the system is maximized. Assume that m* is the transmission point selected by the network controller for the UE. The SINR corresponding to the $j^{th}$ layer is then $\gamma_{m*j}$ and the transmission rate is then $\eta_{m*j}$.

On the other hand in the JT scheme, the same data symbols are transmitted through multiple, say $M_{JT}$ transmission points in the CoMP set. Denote the set of transmission points for JT as $v$, where $v \subseteq \{1, \ldots, M\}$ and let its complement set be denoted by $\bar{v}$. For convenience suppose that all TPs in $v$ serve only the UE of interest over the resource block. Then, we can rewrite the signal model in (1) as $$y = \sum_{i \in v} \sqrt{\frac{\rho_i}{r_i}} H_i W_i e^{j\varphi_i} s + \sum_{i \in \bar{v}} \sqrt{\frac{\rho_i}{r_i}} H_i W_i s_i + \tilde{H}\tilde{W}\tilde{s} + n, \quad (4)$$

where $\phi_i$ is the coherent phase adjustment to improve the SINR for coherent JT. We assume that the serving cell BS with index 1 is always present in $v$ for the JT. We then fix $\phi_1 = 0$. In non-coherent JT, we may not need the feedback on $\phi_i$, i.e., $\phi_i = 0 \; \forall i \in v$ is applied. We can see for JT, a common transmission rank r is employed for all $W_i$, $i \in v$. Define $$H_V \triangleq \sum_{i \in v} \sqrt{\frac{\rho_i}{r_i}} H_i W_i e^{j\varphi_i}.$$

The SINR for the $j^{th}$ layer is then given by $$\gamma_{V,j} = \frac{F_{V,j}^\dagger H_{V,j} H_{V,j}^\dagger F_{V,j}}{F_{V,j}^\dagger \left( \sum_{j',j' \neq j} H_{V,j'} H_{V,j'}^\dagger + \sum_{i \in \bar{V}} \frac{\rho_i}{r_i} H_i W_i W_i^\dagger H_i^\dagger \right) F_{V,j} + F_{V,j}^\dagger R F_{V,j}}, \quad (5)$$

where $F_V$ denotes the receiver filter on the signal in (4) for CoMP JT transmissions. The corresponding rate for the CoMP JT transmission is then $$\eta_V = \sum_{j=1}^{r} \log(1 + \gamma_{V,j}).$$

2 CSI Feedback for CoMP

We now consider the CSI feedback for CoMP schemes. To support all agreed CoMP transmission schemes including JT, CS/CB, and DPS, a general CSI feedback framework has been discussed during the last several 3GPP-RAN1 meetings. From at-least one port of each transmission point in the CoMP set, a reference signal (RS) is sent in one or more resource elements (whose positions are conveyed by the network in advance to the UE) in order to let UE estimate the channel from that port of that TP. Let $H_i$ be the channel matrix estimated by the UE, corresponding to all such ports of the ith TP. In release-10 and earlier legacy systems, an implicit CSI feedback is adopted such that a CSI feedback for a set of contiguous resource blocks (RBs) (which map to a time-frequency resource comprising of a set of consecutive sub-carriers and OFDM symbols) consists of a wideband preferred precoding matrix index (PMI) that indicates a preferred precoder matrix $\hat{G}_1$, a wideband rank index (RI) $\hat{r}$, along with up-to two channel quality indices (CQIs), which are essentially quantized SINRs estimated by the UE. As seen from Section 1 for CB/CS and DPS, such CSI feedback from the UE for each transmission point in its CoMP set to its anchor BS is sufficient as this allows the controller to select one TP for transmission to that UE (on each sub-band if needed) and to obtain a good SINR estimate in order to assign an appropriate modulation and coding scheme (MCS) for the UE. However, for JT, aggregated SINR (CQI) feedback is essential to realize the performance gain by CoMP. For coherent JT, feedback of the inter CSI-RS resource phase information may also be necessary. In the sequel we will use per-TP and per-CS-RS resource inter-changeably. In RAN1 #67 meeting, the following agreement has been reached [2].

CSI feedback for CoMP uses at least per-CSI-RS-resource feedback.

However the contents of this per-CSI-RS-resource feedback have not yet been decided.

Based on this agreement, we now provide efficient approaches for CoMP CSI feedback. We first discuss the alternative solutions for per CSI-RS resource feedback either with or without the common rank restriction, and moreover, the options for inter-CSI-RS-resource feedback. Later we propose a best-ill CSI feedback scheme for CoMP.

2.1 Per CSI-RS Resource Feedback without Common Rank Restriction

Since per-CSI-RS-feedback has been agreed to be mandatory for all CoMP transmission schemes, it raises an issue on the rank feedback for each transmission point. Whether or not to enforce a common rank feedback for all the transmission points in the CoMP set is yet to be decided. We first discuss the pros/cons on the per-CSI-RS-feedback based feedback scheme for CoMP, without the common rank restriction and provide our solutions.

With per CSI-RS resource feedback, each UE sends the CSI feedback for each transmission point in its CoMP set, which is computed assuming single-point transmission hypothesis. Therefore, it is possible that preferred rank varies in the CSI feedback computed for different transmission points. In this option, the UE is allowed to send the best rank for each transmission point along with corresponding PMI/CQIs to the BS.

For CS/CB and DPS CoMP transmission schemes, the transmission to the UE (if it is scheduled) is performed from one transmission point in its CoMP set (on each of its assigned RBs) which corresponds to one CSI-RS resource. For wideband DPS (henceforth referred to as DPS-w) each UE is served by one TP on all its assigned RBs, whereas for subband DPS (DPS-s) the UE can be served by a different TP on each assigned RB. Then, for DPS-w a higher CoMP performance gain can be achieved without common rank restriction as the CSI feedback for each TP computed using a preferred rank is available to the controller. Next, supposing that the CSI-RS feedback is determined based on the assumption that the other TPs in the CoMP set are silent (or muted), the interference from other TPs in the aftermath of scheduling can be approximated by the controller using CSI-RS resource feedback corresponding to the other TPs. Further, even with different assumptions on the interference from other TPs which will be discussed, the controller can estimate the post-scheduling SINR for the selected TP reasonably well. Thus, per-CSI-RS-resource feedback without common rank seems suitable for DPS-w. Similarly for CS/CB, where each UE is served data only by its pre-determined anchor or serving cell TP, there is no significant performance degradation since each UE reports more accurate CSI for other transmission points using the respective preferred ranks. This option also facilitates the fallback from CoMP to non-CoMP single-cell transmissions.

However, for JT enforcing the common per-UE transmission rank will necessitate rank-override when the UE reports different ranks for different transmission points in its CoMP set. Further in this case, another important issue is the mechanism to send the inter-CSI-RS resource feedback or aggregated feedback across multiple CSI-RS resources when there is no common rank restriction.

To accommodate CoMP JT scheme, we now provide the following solution for the case without common feedback rank restriction.

Solution 1: If preferred ranks for different CSI-RS resources are different, the inter-CSI-RS resource feedback or aggregated feedback is computed based on the lowest rank among all preferred ranks. Assume the lowest rank is $\hat{r} = \min\{\hat{r}_i\}$, then in each reported precoding matrix the column subset corresponding to the $\hat{r}$ strongest SINRs is determined. The inter-CSI-RS resource phase feedback or aggregated feedback is computed based on these precoding matrix column subsets and these subsets are used to design the transmit precoder.

We consider an example with a CoMP set having two transmission points. For the cases with three or more transmission points, the results discussed below can be applied similarly. The CSI feedbacks including preferred precoding matrices, quantized SINRs (fedback using CQIs), and rank indices are $(\hat{G}_1, \hat{\gamma}_1, \hat{r}_1)$ and $(\hat{G}_2, \hat{\gamma}_2, \hat{r}_2)$ for the transmission point 1 (TP1) and TP2, respectively. The UE then selects the rank $\hat{r}=\min\{\hat{r}_1,\hat{r}_2\}$. Then the precoding matrix $V_1$ used in CoMP JT is assumed to be formed using $\hat{r}$ columns of $\hat{G}_1$ which correspond to $\hat{r}$ highest SINRs. If there are two or more layers having the same SINR CQI index, a predetermined rule (known to all UEs and TPs) can be applied for column subset selection. The precoding matrix $V_2$ can then be formed similarly. With the inter CSI-RS resource phase $\phi=[\phi_1\ \phi_2]^T$, the composite precoding matrix is formed as $$V_{JT} = \begin{pmatrix} V_1 e^{j\varphi_1} \\ V_2 e^{j\varphi_2} \end{pmatrix}.$$

The inter CSI-RS resource phase feedback is determined by finding the best $\phi$ from a predetermined set assuming the composite precoding matrix $V_{JT}$ is employed for CoMP JT. Without loss of generality, we set $\phi_1=0$ so that only $\phi_2$ can be reported.

Similarly, the aggregated SINR or aggregated CQI feedback is computed assuming that $V_{JT}$ is employed for coherent CoMP JT or non-coherent CoMP JT with $\phi=[0\ 0]^T$.

As mentioned earlier, with Solution 1, the rank override may be needed in case of JT. With Solution 1, a better DPS-w and CS/CB performance may be achieved. The performance of JT will degrade as the first few dominant right singular vectors of the composite channel are not accurately available at the controller. Moreover, common rank feedback is also better suited for DPS-s since in this case a rank override is necessitated if a UE is served by different TPs (for which it has reported different ranks) on its different assigned RBs.

For the feedback overhead, assuming a feedback mode similar to 3-1, i.e. a wideband PMI feedback, wideband rank along with subband CQI feedback, each CSI-RS resource feedback consists of one RI (to indicate a rank say r), and one PMI, and N min$\{2,r\}$ CQIs, where N is number of subbands that the UE is configured to report. Thus with Solution 1, the total feedback for per-CSI-RS resource feedback with M CSI-RS resources is $\Sigma_{m=1}^{M}$ N min$\{\hat{r}_m,2\}$n$_{CQI}$+Mn$_{RI}$+Mn$_{PMI}$), where n$_{CQI}$, n$_{RI}$, and n$_{PMI}$ are number of bits for each feedback of CQI, RI and PMI, respectively. Here, we assume that a set of CQIs for N subband resources are sent back for each per-CSI-RS resource. Note that in case of JT CoMP per-subband inter point phase and/or aggregate CQI(s) could also need to be reported. Such overhead can be reduced by imposing restrictions on CQI feedback, which we will explain later.

If the UE can report feedback for a subset of CSI-RS resources, we propose the following solution.

Solution 2: The standard does not specify the common rank restriction for per CSI-RS resource feedback. With UE centric CSI feedback, UE decides preferred CoMP scheme. If UE prefers JT CoMP scheme, the UE sends per-CSI-RS resource feedback with a common or uniform rank for multiple CSI-RS resources possibly along with aggregated CQI feedback (aggregated across all those CSI-RS resources) and/or inter-CSI-RS resource phase feedback. If UE prefers DPS-w or CB/CS, per-CSI-RS resource feedback is sent without common rank restriction. Further, if the UE prefers DPS-s then it sends per-CSI-RS resource feedback with a common rank. However, such feedback scheme does not restrict the CoMP scheme that the controller should use.

We can see with Solution 2, the rank override may not be necessary for JT and DPS-s. Also if BS employs the CoMP scheme that the UE prefers as indicated in its CSI feedback, the system is able to achieve maximal gain with respect to that UE. Additional feedback may be needed to indicate the preferred CoMP scheme. But such feedback overhead is minimal. Note that we have assumed a wideband indication of one preferred CoMP scheme that is common across all subbands that the UE is configured to report. This reduces the signaling overhead with negligible performance degradation. Further, as an option to reduce overhead the system may decide in a semi-static manner to allow only one of DPS-s and DPS-w.

The feedback overhead for Solution 2 is discussed as follows.

For JT, the total feedback overhead is min$\{\hat{r},2\}$Nn$_{CQI}$+n$_{RI}$+Mn$_{PMI}$, where $\hat{r}$ is the uniform rank selected by the UE. Additional overhead is required for aggregated CQI feedback and/or inter-CSI-RS resource phase feedback.

For CB/CS and DPS-w, the maximum overhead is $\Sigma_{m=1}^{M}$ min$\{r_m,2\}$Nn$_{CQI}$+Mn$_{RI}$+Mn$_{PMI}$ which is same as that for solution 1. However, this can be reduced since with UE centric CSI measurement, UE may only measure the CSI for a subset of M CSI-RS resources. In particular, for DPS, UE may only need to feedback one CSI feedback for the anchor point and one for the best preferred TP. Then in case of DPS-w there is one wideband indication that may be needed for indicating the preferred TP, whereas one indication per subband may be needed for DPS-s. Extending this approach, we may also allow UE to only feedback CSI for the best preferred TP (per subband for DPS-s). With this alternative, while the overhead is reduced the scheduling gain may also reduce since the network will be forced to use the UE preferred TP for the transmission to this UE if it is scheduled. Furthermore, for CB/CS the system can enforce that each user use a specified rank in the feedback of CSI for each TP in its CoMP set that is different from its serving TP. This reduces rank indication overhead and may simplify UE determination of PMI for its non-serving TPs. These specified ranks can be conveyed by the network in a semi-static manner to the UE. Optionally, the specified ranks can be identical for all other non-serving TPs (for example rank-1).

To reduce the performance loss for the fallback to single-cell transmission, we also propose the following CoMP CSI feedback solution for JT.

The UE sends the CSI feedback for the serving TP under single TP transmission hypothesis. For CoMP, UE also reports a wideband PMI for each CSI-RS resource including serving TP with a uniform rank, which can be different from the reported rank for the single serving cell transmission, along with the aggregated CQI for CoMP JT and/or the inter CSI-RS phase feedback.

2.2 Per CSI-RS Resource Feedback with Common Rank Restriction

We may specify the common rank restriction to ensure that a common rank is employed when the UE sends per-CSI-RS resource feedback. With common rank restriction on per CSI-RS resource feedback, there may be a performance degradation if DPS-w or CB/CS CoMP scheme is employed at the BS, as the preferred precoding and rank may not be the best for the transmission point that the network eventually uses. There may also be a performance degradation if the system falls back to the single cell (serving TP) transmission for this UE. We now propose the following solution based on UE centric CSI feedback that may mitigate this possible performance loss.

Solution 3: The standard specifies the common rank restriction for per CSI-RS resource feedback but does not specify which rank to use. With UE centric CSI feedback, in case the UE prefers and indicates JT CoMP or CS/CB the UE may send per-CSI-RS resource feedback with a uniform rank for a subset of CSI-RS resources (possibly along with inter-CSI-RS resource feedback and/or aggregated CQI feedback in case of JT CoMP). With this flexibility, in case DPS-w (DPS-s) is indicated by the UE, the UE may send the CSI feedbacks for the serving cell and the preferred transmission point (preferred TP per subband) with a common rank. UE can also send the CSI feedback for only serving cell and indicate that it prefers to fall back to single cell transmission.

With this approach, the performance degradation for DPS-w and falling back single-cell transmission can be reduced.

As an option to reduce overhead, the system in a semi-static manner can further restrict the common rank to be 1 for solution 3 in case JT and/or CS-CB is preferred. The rationale is as follows. For JT, the CoMP performance gain via coherent phase combining is achieved mostly for rank-1 transmissions. Also with common rank-1 feedback the UE may only need to feedback one aggregate CQI (per subband). For CB/CS, with rank-1 channel feedback, it is easier for the coordinated BSs to control the precoding beams for different TPs to reduce the intra CoMP set interference.

With UE centric feedback, UE can choose the preferred CSI feedback scheme. One simple case is that UE can choose between JT CoMP CSI feedback with a lower rank, e.g., rank-1 feedback with aggregated CQI feedback, or the CSI feedback for the single serving TP with higher rank, e.g., rank 2, (which has less overhead) by comparing the effective rates it deems it can get under these two, i.e., $\eta_1$ and $\eta_v$, where v is the set of TPs being considered by the UE for JT. The one corresponding to the higher rate is the type of transmission scheme (CoMP or fall-back to single serving TP) that the UE prefers and sends the CSI feedback accordingly. However, although this comparison is the best approach on selecting the CSI feedback for this particular UE, it is not a good choice on the system efficiency because when UE selects fall-back to single serving TP, the BS can schedule some data transmissions on the other TPs. To accommodate the potentially scheduled UEs on the other TPs, we suggest the following three alternative approaches.

Alternative 1: An offset $\bar{\eta}_i$ for the ith TP is imposed and signalled to the UE in a semi-statical manner. So the UE compares the sum rate assuming single TP for the UE, $\eta_1 + \Sigma_{i \in v} \bar{\eta}_i$ and the CoMP rate $\eta_v$ to select preferred transmission scheme and send the CSI feedback accordingly. The value $\bar{\eta}_i$ can be the average single-cell transmission rate from the TP i.

Alternative 2: Fractional EPREs or powers $\{\alpha_i \rho_i\}$ are assumed when the UE computes CoMP CQI so that the rate for CoMP JT computed by UE is scaled (or equivalently for each TP i the UE scales its effective estimated channel that includes the power $\rho_i$ by a factor $\sqrt{\alpha_i}$). The scaling factors $\{\alpha_i\}$ (which can be UE specific) can be signalled by the network to the UE semi-statically. UE then computes CoMP SINR according to (5) but with the scaled power $\alpha_i \rho_i$, i∈v, and obtains the CoMP rate $\eta_v(\{\alpha_i \rho_i\})$. The rate comparison is between $\eta_1$ and $\eta_v(\{\alpha_i \rho_i\})$. With the SINR (CQI) feedback based on the fractional powers and knowing $\{\alpha_i\}$, the BS can re-scale the SINR back for appropriate MCS assignment. Note that the role of these $\{\alpha_i\}$ is to bias the UE towards making a choice. To get a finer control each $\alpha_i$ (on a per-TP basis) can be different for different cardinality of the set v and/or they can be different for different rank hypothesis.

Alternative 3: The UE computes the rate from each transmission point, $\eta_m$, and compare the sum rate $\eta_1 + \kappa \Sigma_{i=2}^M \eta_i$ with the rate of CoMP JT $\eta_v$, where κ is a scaling factor that can be informed by the BS in a semi-statical manner. When κ=0, it reduces to the original comparison between the single serving TP transmission rate and CoMP JT rate.

2.3 Best-$\breve{M}$ CSI Feedback

Usually, the BS pre-allocates certain uplink (UL) resources for a UE to send its CSI feedback. Since per-CSI-RS resource feedback is agreed in order to support all CoMP schemes, a large number of UL feedback resources have to be pre-allocated to be able to accommodate the worst case, i.e., the highest transmission ranks for each TP along with N CQIs for each stream (maximum 2 data stream for rank 2 or higher). Even with UE centric CSI feedback, in which the actually feedback bits can be much less, it still could not reduce the signaling overhead since the UL feedback resources are pre-allocated. We now propose a so-called best-M CSI Feedback schemes and provide two alternative approaches. This scheme can be applied to the systems either with or without the common rank restriction.

Alternative 1: The BS configures and semi-statically sends a signal of M and ask the UE selects $\breve{M}$, $\breve{M} \leq M$, CSI-RS resources or TPs to send the CSI feedback for each resources. The BS then pre-allocate the UL feedback channel which is able to accommodate the CSI feedback for $\breve{M}$ CSI-RS resources or TPs. If aggregated CQI or inter CSI-RS resource phase feedback is specified, additional UL feedback resources for these feedback are also allocated. UE is able to select the preferred $\breve{M}$ TPs to send the CSI feedback accordingly. Additional signaling on the CSI feedback corresponding to which CSI-RS resource or TP may be needed. $\breve{M}$ can be UE specific or uniform for all UEs.

We can see that with above approach, the signalling overhead is greatly reduced when $\breve{M}<M$. The reason doing this is that although the CoMP cluster consists of several multiple UE, for a particular UE, the number of effective coordinated TPs may be only two, or three at most. As shown in FIG. 1, CoMP set 100 consists of 3 TPs 108, 110, and 112. However, for UE1 114-UE3 118, there are only two effective TPs for coordination. For UE4 120, by selecting best $\breve{M}=2$ of 3 coordinated TPs, there should not be any significant performance degradation. Of course the UE can send CSI feedback for less-than-$\breve{M}$ CSI-RS resources or TPs.

Although the above approach reduces feedback overhead significantly, the worst scenarios for CSI feedback, particularly, for the CQI feedbacks have be considered when allocating the UL feedback resources, i.e., the maximum rank for a TP or a CSI-RS resource within the CoMP set. This scenario is for both the case without common rank restriction and the case with common restriction but not specifying which rank to use. Hence, we propose the following approach to further reduce unnecessary feedback resource allocations.

Alternative 2: The BS configures and semi-statically sends a signal of $\breve{M}$ and ask the UE selects CSI-RS resources or TPs to send the CSI feedback for total $\breve{M}$ data streams. The BS then pre-allocate the UL feedback channel which is able to accommodate the CSI feedback for $\breve{M}$ data streams. If aggregated CQI or inter CSI-RS resource phase feedback is specified, and configure additional UL feedback resources for these feedback are also allocated. UE is able to select the preferred TPs and ranks for each TP or the common rank for all select TPs with this $\breve{M}$ data stream constrain.

With Alternative-2 approach, UE can select the TPs with total number of CQI feedback sets being $\breve{M}$. For example, the UE can send CSI feedback for $\check{M}/2$ TPs if the common rank is 2 or above, or for $\check{M}$ TPs if the common rank is 1, or any number of TPs as long as $\Sigma_{i \in \nu_{UE}} \min\{r_i, 2\} \leq \check{M}$ for the case without common rank restriction.

One variation of above alternative-2 scheme is that the restriction of $\check{M}$ sets of CQI feedback includes the aggregated CQI. The UE may be able to choose if aggregate CQI is needed and occupy the feedback resources so that less per-CSI-RS resource CSI feedbacks are reported.

2.4 CoMP Feedback Format

As discussed before, with per CSI-RS resource feedback, each UE sends the CSI feedback for each transmission point in its CoMP set, and this per CSI-RS resource feedback is computed assuming single-point transmission hypothesis (i.e., transmission only from the TP corresponding to that CSI-RS resource). Therefore, it is possible that preferred rank varies in the CSI feedback computed for different transmission points. In this option, the UE is allowed to send the best rank for each transmission point along with corresponding PMI/CQIs to its serving TP.

A simple way in which the network controller can control a UE's per CSI-RS resource feedback is to employ a separate codebook subset restriction for each TP in a UE's CoMP set (a.k.a. CoMP measurement set). In other words the controller can inform each UE in a semi-static manner about the codebook subset it should employ for each TP in its CoMP set, so that the UE then searches for and reports a precoder only in the respective subset corresponding to each TP in its CoMP set. This allows the controller to tune the per CSI-RS resource feedback it receives, for instance in case it decides that CS/CB is a more preferable scheme it can configure the subsets corresponding to all non-serving TPs in a UE's CoMP set to include only rank-1 precoding vectors. This allows for better quantization of dominant interfering directions and better beam coordination which is particularly helpful for CS/CB.

Additionally, as an option the controller can also configure a separate maximum rank limit on the rank that can be reported by the UE for each TP in its CoMP set and convey these maximum rank limits to the UE in a semi-static manner. While this can be accomplished also via codebook subset restriction, setting a separate maximum rank limit can decrease the feedback load. For example, if a TP has four transmit antennas, with codebook subset restriction the feedback overhead need not be decreased since it can be designed to accommodate the maximal subset size, which in this case translates to six bits, two bits for rank (up-to rank 4) and four bits for the PMI per rank. On the other hand, by imposing a maximum rank limit of 2, the overhead is 5 bits, one bit for rank (up-to rank 2) and four bits for the PMI per rank. Note that codebook subset restriction can be used in conjunction with maximum rank limit.

Optionally, the network can also have the ability to semi-statically configure a separate feedback mode for each per CSI-RS resource feedback reported by a UE. For instance the network may configure a UE to use a feedback mode for its serving-TP that allows reporting per-subband PMI and CQI(s) and a mode that allows reporting a wideband PMI with per-subband CQI(s) for some or all of the other TPs in its CoMP set. This allows the controller to reduce the overall CoMP feedback load without a significant degradation in performance.

Let us denote the overall CoMP CSI feedback from a UE for a particular choice of: per CSI-RS resource feedback modes, possible accompanying restrictions such as common rank report for all TPs in the CoMP set and additional aggregate CQI(s) or inter-point phase resource(s): as a CoMP feedback format. A key bottleneck in designing CoMP CSI feedback schemes is that the size of the UL resource used for reporting a particular CoMP feedback format must be pre-allocated and must be designed to accommodate the worst-case load. This is because the TP which receives the feedback should know the physical layer resources and attributes used for the UE feedback in order to decode it. Then, if the UE is allowed to dynamically select the feedback format from a set of permissible formats, the TP which receives its feedback will have to employ blind decoding in order to jointly determine the format used by the UE and the content within it. Such blind decoding increases the complexity and thus it is better to allow only a small cardinality for the set of permissible CoMP feedback formats, say 2. Another even simpler solution is for the controller to semi-statically configure a feedback format for a UE which then employs that format for its CSI feedback until it is re-configured by the network.

We now provide some useful guidelines for CoMP feedback format design.

1. CoMP set size dependent feedback format: The CoMP set for a UE is configured by the network. Thus one feedback format can be defined for every possible CoMP set size in the CoMP cluster. However, a simple network design also demands a small number of feedback formats. Typical possible values of CoMP set size are: a set size of 2 and a set size of 3. Accordingly we can define a separate feedback format for size 2 and another one for size 3. Additionally, as an option one other format common for all sizes greater than 3 can be defined. Alternatively, the network can restrict itself to configure a CoMP set for each UE which is of size no greater than 3 and hence this additional format need not be defined. The UE will use the format corresponding to the size of its CoMP set. Then, each of these formats can be designed separately and a key idea we can exploit is that for a given feedback load, the format for a smaller set size can convey more information about the TPs in the CoMP set.

2. CQI feedback in each CoMP feedback format: Note that at-least one CQI per sub-band can be reported by the UE for each TP in its CoMP set (or for each TP in its preferred set of TPs if the CoMP set size is large and the UE has been configured to report CSI for only its preferred TP set which can be any subset (of a configured cardinality) of its CoMP set). We highlight some approaches to configure the CQI feedback. For simplicity we consider the case where the UE can report at-least one CQI per sub-band for each TP in its CoMP set. The other case follows after straightforward changes.

The UE can be configured to report one or at-most two CQI(s) per sub-band for each TP in its CoMP set. Each of these CQI(s) are computed under the assumption that the other TPs in the CoMP set are muted so that only the outside CoMP set interference is captured in these CQI(s). Then, the controller can approximate the whitened downlink channel from each TP to the user on each sub-band using the corresponding reported PMI and CQI(s), i.e., with reference to the model in (1) the whitened channel from the $i^{th}$ TP to the user is $R^{-1/2}H_i$ which is approximated using the reported PMI and CQI(s) corresponding to TP i as $\hat{H}_i$. The controller can then model the signal received by the user in the aftermath of scheduling as $$y \approx \sum_{i=1}^{M} \hat{H}_i x_i + \tilde{n}. \quad (6)$$

where $\tilde{n}$ is the additive noise with $E[\tilde{n}\tilde{n}^\dagger]=I$. Using the model in (6) the controller can design the transmit precoders and obtain estimates of received SINRs for each choice of transmit precoders and choice of CoMP transmission schemes, i.e., CS/CB or DPS or JT. This allows the controller to select an appropriate transmission scheme. In addition to these CQI(s), the UE can also report per sub-band "fallback" CQI(s) for only the serving TP. These CQI(s) are computed using the PMI reported for the serving cell after incorporating the interference measured by the UE from TPs outside CoMP set as well as all other TPs in the CoMP set. Using these CQI(s) along with the PMI reported for the serving cell, the controller can first approximate the whitened downlink channel from the serving TP to the user on each sub-band (the whitening is now with respect to both intra-CoMP set and outside CoMP set interference) and then model the signal received by the user in the aftermath of scheduling as $$y \approx \hat{H}'_1 x_1 + \tilde{n}', \quad (7)$$

where again $E[\tilde{n}'\tilde{n}'^\dagger]=I$. Using the model in (7) the controller can schedule the user as a conventional single-cell user. This allows single cell fall-back scheduling.

In addition, as an option the network can also configure each UE to report per sub-band aggregate CQI(s) where the set of TPs from the CoMP set used by the UE to compute the aggregate CQI(s) are configured by the network (a.k.a. controller). Recall that the aggregate CQI(s) are computed assuming joint transmission from a set of TPs (with the other TPs if any in the CoMP set assumed to be silent). While the model in (6) allows for obtaining post-scheduling SINR estimates under JT, the SINRs so obtained need not be accurate enough for good JT gains. The SINRs estimates obtained using aggregate CQI(s) allow for better link adaptation and hence larger gains via joint transmission. Alternatively, instead of reporting these aggregate CQI(s) on a per sub-band basis, they may be reported only for the best M sub-bands (along with indices of the corresponding sub-bands) where M is configured by the network. Furthermore, as an option the network can also enforce that these aggregate CQI(s) are computed as per a configurable maximum rank limit. For example, if the network sets this limit to one, then only one aggregate CQI is reported per sub-band and this is computed using the best (strongest) column from each of the PMIs that have been determined by the UE in the per-CSI resource feedback corresponding to the TPs over which it is computing the aggregate CQI. In case of a higher maximum rank limit, two aggregate CQIs are reported per sub-band and are computed using the best (strongest) column subsets which can be determined via the procedure described previously for CSI feedback for JT without the common rank constraint.

The UE can be configured to report one or at-most two CQI(s) per sub-band for each TP in its CoMP set. Each of these CQI(s) are computed after incorporating the interference measured by the UE from TPs outside CoMP set as well as all other TPs in the CoMP set. Note that the post-scheduling interference that the UE will see from TPs in its CoMP set that are not serving data to it will depend on the transmit precoders that are assigned to these TPs. Then, the controller can also exploit its knowledge of the specific transmit precoders that were used by the TPs in the UE's CoMP set in the sub-frames over which the UE computed the CQI(s). This allows the controller to modify the reported CQIs to obtain estimates for the post-scheduling SINRs. The modification can be done using any appropriate rule that considers the choice of transmit precoders that the network wants to employ and those that were used at the time of CQI computation. Such SINR estimates can provide reasonable CoMP gains when CS/CB or DPS is used. Notice that no additional fall-back CQI may be needed since such CQI is already reported for the serving TP. However JT gains may be degraded due to inaccurate link adapation. As discussed for the previous case, as an option the UE can be configured to report additional aggregate CQI(s) to enable JT CoMP gains. These aggregate CQI(s) are computed assuming joint transmission from a (configured) set of TPs incorporating the interference from other TPs if any in the CoMP set.

We now consider some further variations that can be employed in the CoMP feedback format design.

1. Different degrees of flexibility in the rank reports: The two cases that have been discussed before are the one where full flexibility is allowed in that a separate rank report (with or without maximum rank limit) can be reported for each TP in the CoMP set. The other one is where a common rank must be reported for all TPs in the CoMP set. Another possibility that has a level of flexibility in between these two options is one where a separate rank can be reported for the serving TP along with one other separate rank that is common for all other non-serving TPs in the CoMP set. Furthermore, separate maximum rank limits can be imposed on these two rank reports. Note that this option has lower feedback compared to the full flexibility case and can convey CSI more accurately compared to the case where a common rank must be reported for all TPs in the CoMP set.

2.5 CoMP Feedback Formats: CoMP Measurement Set Size 2 or 3

In this section we will further specify the feedback format design by focusing on measurement set sizes 2 and 3. In the following we will assume that each CSI-RS can be mapped to (or corresponds to) a TP. These principles can be extended in a straightforward manner to the case where a CSI-RS corresponds to a virtual TP formed by antenna ports from multiple TPs. Let us first consider measurement set size 2. We will list the various alternatives in the following.

Per-point CSI-RS resource feedback for each of the two CSI-RS resources configured for the measurement set. Each such feedback comprises of PMI/CQI(s) computed assuming single-point transmission hypothesis from the TP corresponding to that CSI-RS resource with the remaining TP (corresponding to the other CSI-RS resource) being silent, henceforth referred to as Per-point CSI-RS resource feedback with muting. Note that the frequency granularity of the PMI and the CQI(s) to be sent by the user in a per-point CSI-RS resource feedback can be separately and independently configured by the network in a semi-static manner. For instance, the user can be configured to send per-subband CQI(s) and wideband PMI in one per-point CSI-RS resource feedback, while reporting per-subband CQI(s) and per-subbband PMI in the other per-point CSI-RS resource feedback.

Per-point CSI-RS resource feedback with muting for each of the two CSI-RS resources. In addition, separate fallback PMI/CQI(s) (henceforth referred to as fallback CSI) are also reported. This fallback CSI is computed under the assumption of single-point transmission from the serving TP and interference from all TPs outside the CoMP set as well as interference from the other non-serving TP in the CoMP set. For simplicity and to avoid additional signaling overhead, the frequency granularities of the PMI and CQI(s) in the fallback CSI can be kept identical to those of their counterparts in the per-point CSI-RS resource feedback with muting for the serving TP. Note that the covariance matrix for the interference from all other TPs can be estimated by the UE using resource elements configured for that purpose by the network. Alternatively, the UE can be configured by the network to estimate the covariance matrix for the interference from outside the CoMP set using certain resource elements. Then, the user can be made to leverage the fact that it has already estimated the unprecoded downlink channel matrix from the other TP in its CoMP set. Using this channel estimate the UE can assume a scaled identity matrix to be the precoder used by the other TP and compute the covariance matrix, which then is added to the covariance matrix computed for outside the CoMP set. The sum covariance matrix is then used to determine the fallback PMI and compute the associated fall back SINRs and fallback CQIs. Note that the scaling factor in the scaled identity precoder can be informed to the UE in a semi-static manner and can be based on factors such as the average traffic load being served by the other TP (which is known to the network). A higher scalar corresponds to a higher traffic load. Similarly, the covariance matrix for the other TP can also be computed by the UE assuming the precoder for the other TP to be a scaled codeword matrix where the codeword can be uniformly drawn from the codebook subset. The choice of subset and the scaling factor can be conveyed to the UE by the network in a semi-static manner.

Per-point CSI-RS resource feedback with muting for each of the two CSI-RS resources. To save signaling overhead, in the fallback CSI only fall CQI(s) are reported, where in each subband these CQI(s) are computed using the PMI reported for the serving TP (in the per-point CSI-RS resource feedback with muting) corresponding to that subband and the procedure described above. Alternatively, since the rank reported for the serving TP under muting can be an aggressive choice for fallback (recall that the fallback also assumes interference from the other TP) a separate rank indicator can be allowed for fallback. Specifically the UE can choose and indicate any rank R less than or equal to the one reported for the serving TP under muting. Then R columns of the PMI reported for the serving TP (corresponding to the R highest SINRs recovered from the associated CQI(s) under muting) are obtained. The fall back CQI(s) are then computed using this column subset.

Per-point CSI-RS resource feedback with muting for each of the two CSI-RS resources. The network can configure in a semi-static manner the TP that the UE may assume to be the serving TP for computing the fallback CQI(s). The remaining TP is then treated as the interferer and the procedure described above is employed.

Per-point CSI-RS resource feedback with muting for each of the two CSI-RS resources. The UE dynamically chooses the serving TP for computing the fallback CQI(s). The remaining TP is then treated as the interferer and the procedure described above is employed. The choice of serving TP for computing fallback can be configured to be the one which offers a higher rate as per the CQI(s) computed under muting. Note that in this case the choice is implicity conveyed to the network via the CQI(s) computed under muting and hence need not be explicitly indicated. Moreover, the choice can vary across subbands based on the per subband CQI(s). However, to enable simpler fallback operation the UE can be configured to determine a wideband choice based on the sum rate across all subbbands so that even in this case the choice is implicitly conveyed. Alternatively, a separate wideband indicator can be employed to enable the UE to indicate its choice which allows the UE to arbitrarily decide its choice albeit on a wideband basis.

Per-point CSI-RS resource feedback with muting for each of the two CSI-RS resources. A common rank constraint on the two CSI-RS resource feedbacks is enforced so that only one rank indicator can be reported. Optionally, fallback CSI as per any one of the above listed options is also reported. Further optionally, aggregate CQI(s) computed using the two PMIs (determined for per-point CSI-RS resource feedback with muting) are also reported.

Let us now consider measurement set size 3. We will list the various alternatives in the following.

Per-point CSI-RS resource feedback for each of the three CSI-RS resources. Each such feedback comprises of PMI/CQI(s) computed assuming single-point transmission hypothesis from the TP corresponding to that CSI-RS resource with the remaining TPs (corresponding to the other two CSI-RS resources) being silent, henceforth referred to as Per-point CSI-RS resource feedback with muting. Note that the frequency granularity of the PMI and the CQI(s) to be sent by the user in a per-point CSI-RS resource feedback can be separately and independently configured by the network in a semi-static manner. The configuration can be different for different TPs in the user's CoMP set.

Per-point CSI-RS resource feedback with muting for each of the three CSI-RS resources. In addition, separate fallback PMI/CQI(s) (henceforth referred to as fallback CSI) are also reported. These CQI(s) assume single-point transmission from the serving TP and interference from all TPs outside the CoMP set as well as interference from the other TPs in the CoMP set. Note that the covariance matrix for the interference from all other TPs can be estimated by the UE using resource elements configured for that purpose by the network. Alternatively, the UE can be configured by the network to estimate the covariance matrix for the interference from outside the CoMP set using certain resource elements. Then, the user can be made to leverage the fact that it has already estimated the unprecoded downlink channel matrix from each of the other TPs in its CoMP set. Using these channel estimates the UE can assume a scaled identity precoder for each of the other TPs and compute the respective covariance matrices, which then are added together to the covariance matrix computed for outside the CoMP set. The sum covariance matrix is then used to compute the fall back SINRs and fallback CQIs. Note that the scaling factors in the scaled identity precoders, respectively, can be informed to the UE in a semi-static manner and can be based on factors such as the average traffic loads being served by the other TPs (which are known to the network). A higher scalar corresponds to a higher traffic load. Similarly, the covariance matrices for the other TPs can also be computed by the UE assuming the precoder for each other TP to be a scaled codeword matrix where the codeword can be uniformly drawn from a codebook subset. The choice of subset and the scaling factor (associated with each other TP) can be conveyed to the UE by the network in a semi-static manner.

Per-point CSI-RS resource feedback with muting for each of the three CSI-RS resources. To save signaling overhead, in the fallback CSI only fall CQI(s) are reported, where these CQI(s) are computed using the PMI reported for the serving TP and the procedure described above. Alternatively, since the rank reported for the serving TP under muting can be an aggressive choice for fallback (recall that the fallback also assumes interference from the other TP) a separate rank indicator can be allowed for fallback. Specifically the UE can choose any rank R less than or equal to the one reported for the serving TP under muting. Then R columns of the PMI reported for the serving TP (corresponding to the R highest SINRs recovered from the associated CQI(s) under muting) are obtained. The fall back CQI(s) are then computed using this column subset.

Per-point CSI-RS resource feedback with muting for each of the three CSI-RS resources. The network can configure in a semi-static manner, the TP that the UE may assume to be the serving TP for computing the fallback CQI(s). The remaining TPs are then treated as the interferers and the procedure described above is employed. Alternatively, even the subset among the two other remaining TPs to be treated as interferers can be conveyed to the UE by the network in a semi-static manner. The TP (if any) not in the subset is assumed to be silent while computing these CQI(s). Notice that there are multiple hypotheses under which the fallback CQI(s) can be computed depending on the configured fallback choice of serving and interfering TPs. In one feedback embodiment, the fallback CQI(s) corresponding to multiple such choices can be simultaneously reported. Alternatively, to save feedback overhead they can be reported in a time multiplexed manner. In particular, the user can be configured to follow a sequence of reporting in which each report in the sequence includes fallback CQI(s) computed according to a particular choice of serving and interfering TPs. The sequence configuration can be done by the network in a semi-static manner.

Per-point CSI-RS resource feedback with muting for each of the three CSI-RS resources. The UE dynamically chooses the serving TP for computing the fallback CQI(s). The remaining TPs are then treated as the interferers and the procedure described above is employed. The choice of serving TP can be configured to be the one which offers the highest rate as per the CQI(s) computed under muting. Note that in this case the choice is implicity conveyed to the network via the CQI(s) computed under muting and hence need not be explicitly indicated. Moreover, the choice can vary across subbands based on the per subband CQI(s). However, to enable simpler fallback operation the UE can be configured to determine a wideband choice based on the sum rate across all subbbands so that even in this case the choice is implicitly conveyed. Alternatively, a separate wideband indicator can be employed to enable the UE to indicate its choice which allows the UE to arbitrarily decide its choice albeit on a wideband basis.

Per-point CSI-RS resource feedback with muting for each of the three CSI-RS resources. A common rank constraint on the three CSI-RS resource feedbacks is enforced. Optionally, in addition fallback CSI as per any one of the above listed options can also be reported. Further optionally aggregate CQI(s) computed using the three PMIs (determined for per-point CSI-RS resource feedback with muting) assuming joint transmission from all three TPs are also reported.

Per-point CSI-RS resource feedback with muting for each of the three CSI-RS resources. A common rank constraint on the three CSI-RS resource feedbacks is enforced. Aggregate CQI(s) computed using the the serving PMI and one other PMI (both determined for per-point CSI-RS resource feedback with muting) assuming joint transmission from the corresponding two TPs, with the remaining TP being silent, are also reported. The wideband choice of the other TP is also indicated. Optionally, in addition fallback CSI as per any one of the above listed options can also be reported.

2.6 Feedback Modes for CoMP JT

For JT, additional feedbacks other than per-CSI-RS resource feedbacks seem necessary, e.g., aggregate CQI feedback and/or inter CSI-RS resource phase feedback. We now provide several options to extend previous CSI feedback mode for CoMP.

For the system of a very low user load, the resources will be mostly allocated to one user at a time instance. For this scenario, the wideband CQI feedback is sufficient. The PMI feedback can be either wideband (to reduce the feedback overhead) or subband (to improve the system performance). Then we propose a CSI feedback mode for CoMP as follows.

Proposal 1: The CSI feedback for CoMP including per CSI-RS resource feedback containing a wideband CQI feedback and subband PMI feedbacks for each CSI-RS resource and a wideband aggregated CQI feedbacks for CoMP JT.

We can see for this feedback mode, we only introduce at most two additional wideband CQI feedbacks (for rank 2 or more CoMP JT) for one TP set for CoMP JT.

For the aggregated CQI feedback, we may not need the CQI feedback for each subband, we then have the following proposal.

Proposal 2: For aggregated CQI feedback for CoMP JT, the UE may only report the CQIs for $\check{N}<N$ preferred subbands along with the corresponding subband indices. The selected subband CQI reports can be accompanied with subband PMI feedback.

Figure 3:
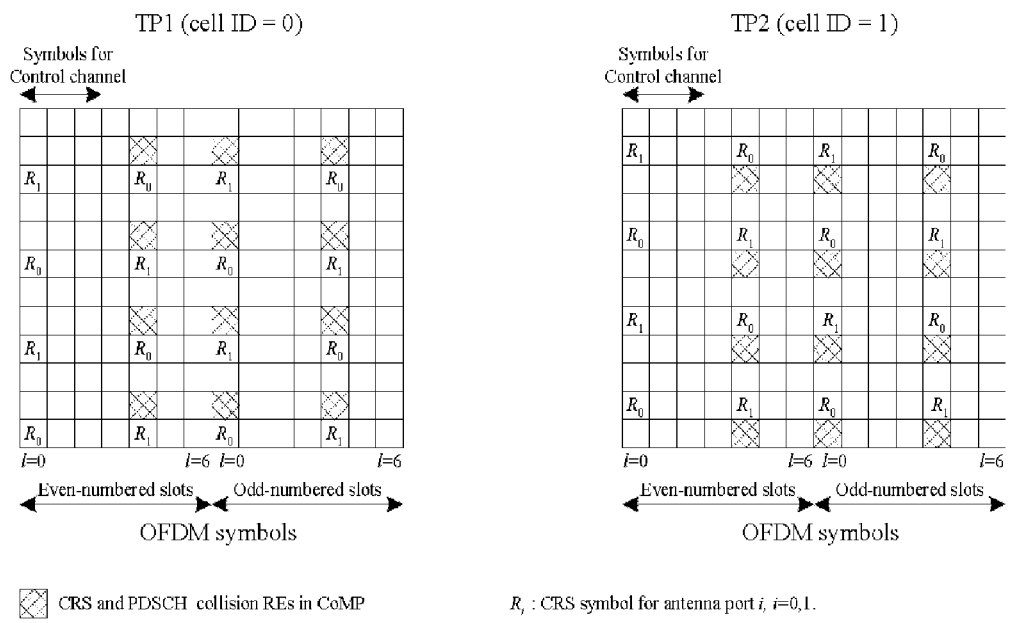
FIG. 3 depicts an example of CRS/PDSCH collisions for two TPs with different cell IDs. Both TPs have two CRS antenna ports.

3 PDSCH Mapping in CoMP 3.1 Problems of PDSCH Mapping in CoMP 3.1.1 CRS-PDSCH Collision Issues In order to support legacy (Release 8) UEs, the CRS can be sent out periodically [1]. The 3GPP LTE cellular system supports CRS's for up to 4 antenna ports. The CRS is positioned on the REs with a cell-specific frequency shift. Therefore, for the cells or the TPs with different cell IDs, the CRS RE positions are different. This will cause the collision with data symbols transmitted on the PDSCH for the CoMP joint transmission in which the data symbols are transmitted on the same RE from different cells or TPs. Since the CoMP transmission scheme is transparent to the UE, such collision also exists for the CoMP DPS transmissions as for DPS, the UE does not know which TP is eventually employed by the network to serve him. An example is shown in FIG. 3, in which two TPs with different cell IDs transmit CRS's each with 2 antenna ports. Due to different cell ID, the RE locations for the CRS are different. For the JT, the data have to be transmitted through both TPs. Therefore, for the CRS RE positions on the data channel (PDSCH) at either TP, JT cannot be realized due to the collisions between CRS and data REs for these two TPs. We can ignore the collision by simply transmitting the symbol though either TP without implementing JT at the collision REs. However, this will cause significant performance degradation due to the interference. On the other hand, for DPS, since CoMP transmission is transparent to the UE, the UE does not know which TP is eventually selected to serve him. Therefore, the UE does not have the knowledge of the exact RE positions for CRS sent from this TP. Again, for DPS, although the UE may still assume the CRS positions based on the serving TPs where the UE receives the control signalling, the mismatch between the data symbol and CRS signal will cause the performance degradation. This seems more severe than the problem in JT as all the data symbols on the collided REs are missed for detection. There is no such collision issue for the CoMP CS/CB transmission scheme since in CS/CB, the transmission is always performed from the serving TP.

Figure 4:
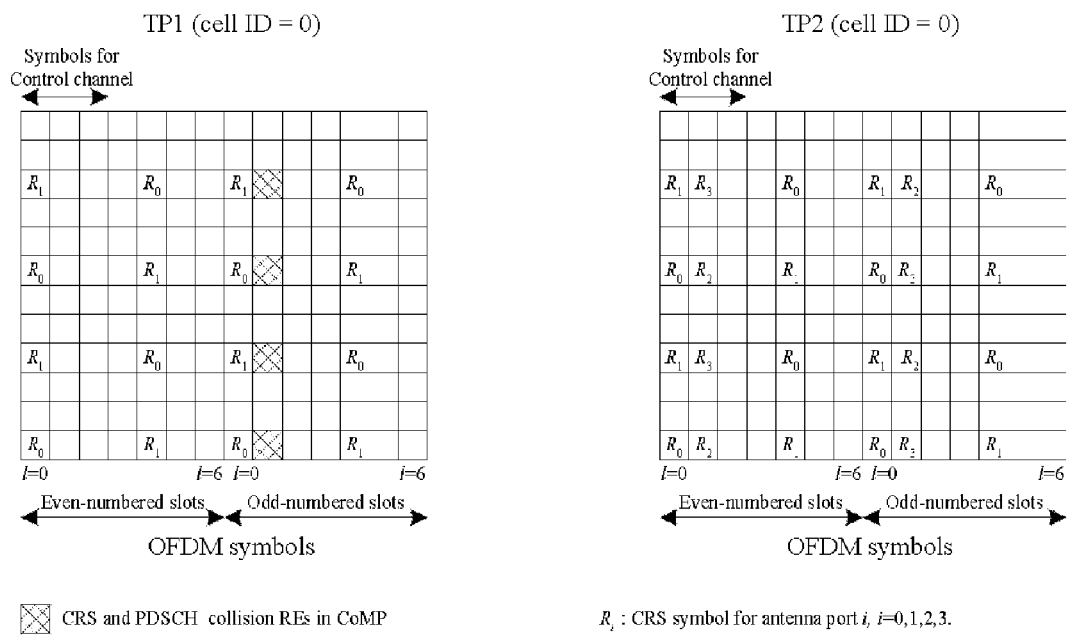
FIG. 4 depicts an example of CRS/PDSCH collisions for the TPs with the same cell IDs but different number of CRS antenna ports. One TP (left) has two CRS antenna ports and the other (right) has four antenna ports.

Such collision problem is also arise for the CoMP TPs with the same cell ID. When the number of antenna ports is the same among all the TPs with the same cell ID, there is no issue since the CRS positions are exactly the same for all the TPs. However, for the HetNet, the number of antenna ports may be different among the coordinated TPs, e.g., the low power nodes might be equipped with less antennas than the macro base station. For the CoMP TPs with the same cell ID but different number of antenna ports, i.e., asymmetric antenna settings, the CRS for the TP with more antenna ports will collide with the PDSCH for the TP with less antenna ports. An example is shown in FIG. 4, where the TP on the right has 4 antenna ports and the left has 2 antenna ports. We can see that the TP with 4 antenna ports has 4 CRS REs collided with the TP with 2 antenna ports on the data REs. Please note that the asymmetric antenna setting also exists for the CoMP TPs with different cell IDs. Since the coded QAM sequence is sequentially mapped to the PDSCH RE resources, if the number of CRS REs are different, the UE will not be able to decode the sequence at all due to the shifting of QAM symbol sequence. This is more severe than the CRS interference.

A similar collision issue can occur for other RSs. Although the CRS-PDSCH collision issue is explained as an example in the following sections, the present invention can apply to other RSs.

3.1.2 PDSCH Starting Point

Figure 5:
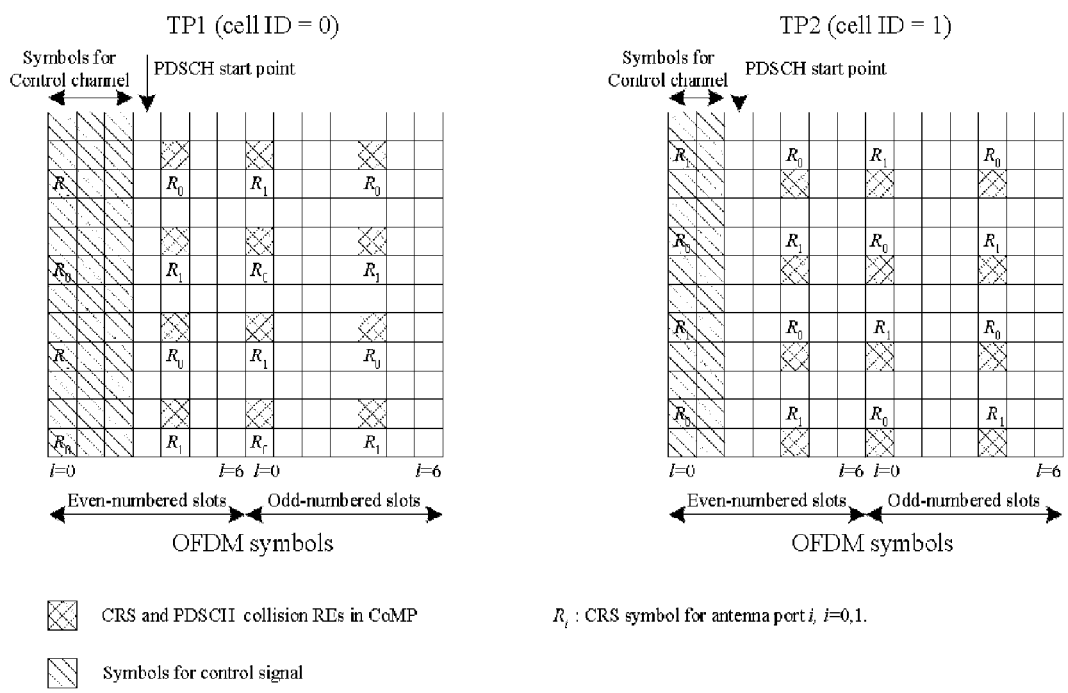
FIG. 5 depicts an example of PDSCH starting point mismatch for the TPs with different cell IDs.

In a subframe, the first several OFDM symbols are allocated for sending control signaling, i.e., PDCCH in LTE and LTE-A system. The data channel PDSCH starts from the next OFDM symbol after PDCCH. For different transmission points, the numbers of OFDM symbols for PDCCH transmission can be different. Consequently, the starting points for PDSCH may be different. Again, since the coded QAM sequence is sequentially mapped to the PDSCH RE resources, the mismatch of PDSCH starting points among TPs in the CoMP set will cause the issue for both joint transmission and DPS in CoMP transmissions if UE does not know the start point of PDSCH. An example is shown in FIG. 5.

3.2 PDSCH Mapping in CoMP

We can see due to the aforementioned issues of PDSCH RE mapping in CoMP, some assumptions have to be made or some signaling is needed to solve the problems in order to make CoMP work properly in LTE-A systems. We now consider the following alternatives on the PDSCH mapping in CoMP.

3.2.0 Resource Mapping Solutions

To solve the CRS/PDSCH collision issue, there are several existing methods summarized in [2]. Among the transparent approaches, one scheme is to transmit the data for CoMP UEs on the MBSFN (multicast/broadcast over a single frequency network) subframe in which there is no CRS transmission. This restriction limits the resource utilization for CoMP transmissions. The second solution is not to transmit data at all for the CRS OFDM symbols, meaning that the entire OFDM symbol containing the CRS for any TP in the CoMP set is excluded for data transmissions in CoMP systems. Obviously this approach wastes the resources and degrades the spectral efficiency performance for CoMP. Another transparent solution is just to perform the CoMP for the TPs with the same cell ID. However, it has been agreed that CoMP transmissions can be performed for the cells with different cell IDs. Also as aforementioned, single cell ID CoMP does not solve the collision problem for the CoMP TPs with different number of antenna ports. We can see that all these approaches are not efficient. There are also some other non-transparent approaches, e.g., signaling the UE the CoMP transmission TP or TPs (for DPS or JT) so that the UE knows the active TP set and the data can be allocated to the REs without collision. Another non-transparent approach is dynamic or semi-static CRS mapping pattern signalling. These two approaches violate the agreed CoMP transparency principle in the 3GPP standardization. Also since the CoMP transmission is dynamic scheduled and UE specific, the signaling of the active CoMP TP set or CRS mapping patterns will significantly increase the DL signaling overhead.

We now provide some efficient CoMP transparent solutions to address the CRS/PDSCH collision issue. We know that in the CoMP system, the network configures and signals the UE the TP set for which UE measures the channels. Such TP set is called measurement set. The CoMP transmission TP or TPs will be selected from the measurement set. First we assume that the UE knows the number of CRS antenna ports for each TP in the measurement set and provide the following resource mapping approach.

The union of the REs allocated for CRS transmissions for the TPs in the measurement set of a CoMP UE are excluded from the resource mapping for the CoMP (JT or DPS) data transmissions in PDSCH for this UE. In other words, the resource mapping on the PDSCH for a CoMP UE can avoid any RE position that is allocated for a CRS transmission in any TP in the measurement set for this UE.

Figure 6:
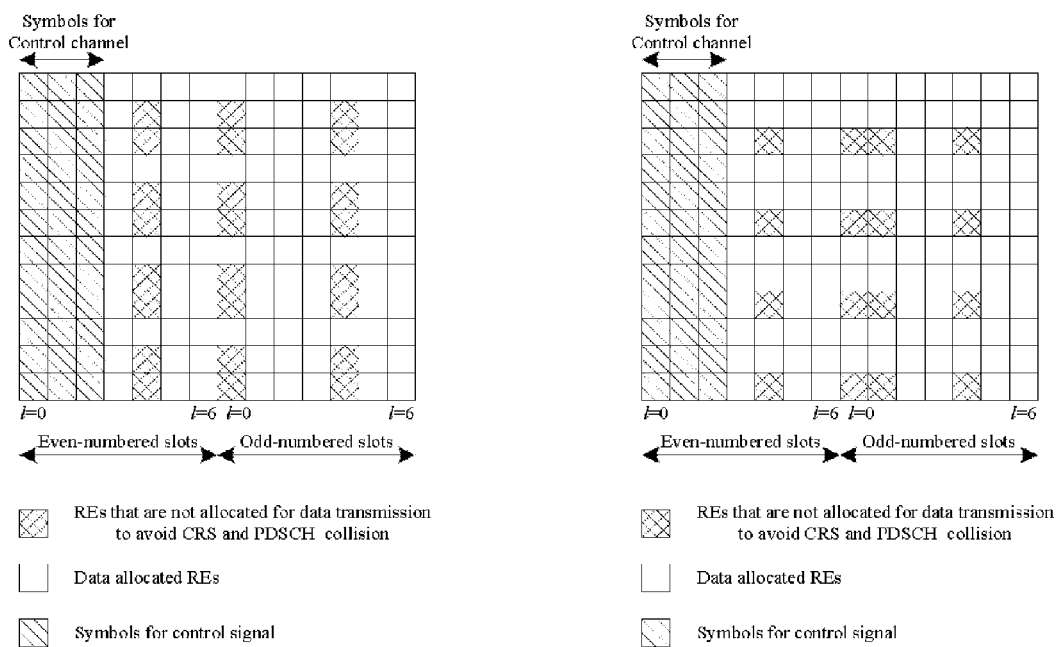
FIG. 6 depicts resource mapping for CRS/PDSCH collision avoidance. Left: the resource mapping for the example in FIG. 3. Right: the resource mapping for the example in FIG. 4.

We can see that since both the network and the UE know the TPs in the measurement set, the union of the CRS RE positions are then known to both. Thus the resource mapping on an RB is known to both for transmission and detection. Also since the measurement set is usually small, the union of the CRS RE positions are less than REs on the OFDM symbols containing a CRS for any TP. Therefore, the proposed transparent approach is more efficient than the existing approaches. We can see this resource mapping is user specific. However, since the network already manages the user specific CoMP transmissions dynamically, the user specific resource mapping does not increase much complexity on the network side. Moreover, this proposed approach can be applied to both the collision cases with the different cell ID and with the same cell ID but asymmetric antenna settings. The resource mapping solutions for the examples shown in FIG. 3 and FIG. 4 are illustrated on the left portion and right portion of FIG. 6, respectively. We assume that for each example there are only two TPs in the measurement set. We can see that from the left part of FIG. 6, the union of CRS RE positions in PDSCH from two TPs with different cell ID are excluded for data mapping. On the right side, the union of the CRS RE positions excluded from the data transmission are essentially the same CRS REs for the TP with 4 CRS antenna ports. Therefore, for the TPs with the same cell ID, the solution can be rewritten as follows.

> For the CoMP TPs with the same cell ID, the resource mapping for either JT or DPS CoMP data transmissions on the PDSCH for the CoMP UE is according to that of the TP with the maximum number of CRS antenna ports in the measurement set of this UE.

A variation of the proposed scheme is that the network broadcasts the CRS pattern information, which may include the cell ID and the number of CRS antenna ports, of all TPs in the CoMP cluster, the largest TP set for CoMP network. For the CoMP cluster with the same cell ID, since the cell ID is known to the UE, only the maximum number of CRS antenna ports is broadcasted to all UEs served by the CoMP cluster. Then the resource mapping for all CoMP UE is to avoid the union of the CRS RE positions for all TPs in the CoMP cluster with different cell ID, or the CRS RE positions according to the TP with the maximum number of CRS antenna ports. This approach is not UE specific, thus does not introduce additional complexity on the resource mapping on the network side. However, this approach may be only suitable for the scenario of the same cell ID CoMP as the excluded RE positions are at most the ones corresponding to the largest possible number, which is 4, of CRS antenna ports. For the CoMP cluster with different cell IDs, this approach is not efficient since the size of the CoMP cluster is usually much larger than the CoMP measurement size. With a large size of CoMP cluster, this approach might eventually exclude the any OFDM symbol which contains a CRS RE for some TP.

CRS is mainly used for LTE (release 8) UEs for channel estimation and data symbol detection. In LTE Advanced (release 10 or later) systems, a UE uses CSI-RS to estimate the channel. The UE may not monitor or detect the CRS. Thus, the UE may not be able to know the number of CRS antenna ports, consequently the CRS RE mapping pattern, for the TPs in its measurement set. For this case, we then propose the following solution.

> The network semi-statically signals the UE the maximum number of antenna ports for CRS for the TPs in the measurement set. Then UE assumes that the CRS pattern for each TP follows the CRS positions corresponding to the maximum number of antenna ports. The resource mapping at the base station for the CoMP data transmission thus follows the same assumption for this CoMP UE.

Since the UE detects the cell ID for each TP in its CoMP measurement set, with the knowledge of number of CRS antenna ports, the UE knows the CRS pattern and positions. Also the CRS RE positions for less antenna ports are the subset of that for more antenna ports. Therefore, the above proposed approach is able to avoid the CRS/PDSCH collisions. Of course, the network may semi-statically inform the UE about the number of CRS antenna ports for each TP in its measurement set. Then the DL signal overhead is slightly increased.

We now consider the data symbol sequence mapping or allocations for the proposed resource mapping with CRS/PDSCH collision avoidance. For any method with CRS/PDSCH collision avoidance, the number of REs in an RB for the CoMP data transmission will be less that that for conventional single-cell or CoMP CS/CB transmissions. Then the assigned transmission block size (TBS) can be changed corresponding to the change of available RE for data transmission to maintain the same effective data rate for the same modulation and coding scheme (MCS). However, to accommodate the change of assigned TBS for the proposed schemes for CRS/PDSCH collision avoidance, we might need to change the entire TBS table in [3] eventually which will have a large impact on the specification. Therefore, we propose the following approach. The TBS assignment still follows the same TBS table in [3] and obtain the same data symbol sequence, e.g. $S_0, S_1, \ldots$. We take the case in the FIG. 3 as the example. We first allocate the data symbol allocation for the UE according to the data transmission on the serving cell or TP as shown in the left part of FIG. 7. For the resource mapping with CRS/PDSCH collision avoidance, as shown in the right part of FIG. 7, the network or CoMP active TP or TPs simply puncture and do not transmit the originally allocated data symbols that collides with the CRS RE positions on other TPs in the CoMP measurement set of this UE. Since the proposed resource mapping for CRS/PDSCH collision avoidance does not exclude many REs for data transmission, the slight increase of the final effective information rate will have nearly no impact on the receiver performance.

Figure 7:
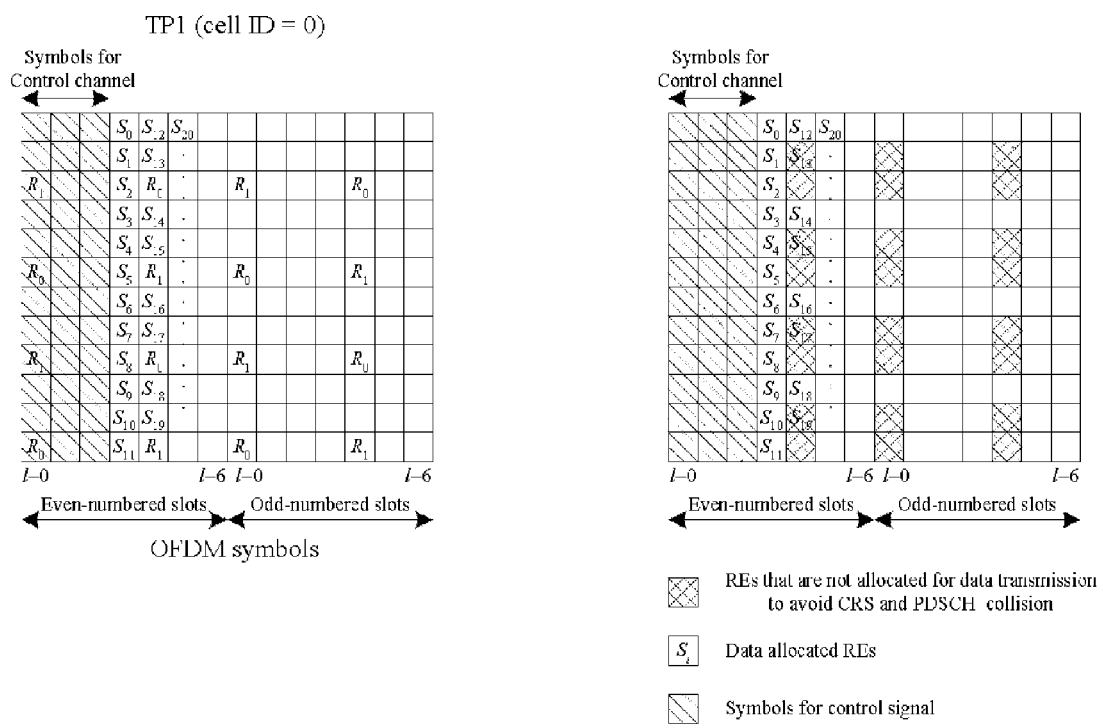
FIG. 7 depicts data symbol allocations for CRS/PDSCH collision avoidance. Left: Original data symbol allocation assuming the serving TP single cell transmissions. Right: Data symbol allocations for CoMP transmissions (JT or DPS) with CRS/PDSCH collision avoidance, method 1.

The alternative approach is shown on the right portion of FIG. 7, in which the network sequentially allocates the data symbols to the REs without placing any symbol on the collided RE. Then with this approach, some data symbols at the end of symbol sequence will not be allocated or transmitted. Although the final effective information rate is the same as that in the previous approach, due to sub-block interleaving, puncturing consecutive data symbols at the end of sequence may incur relatively larger performance degradation.

3.2.1 Alignment with the Serving Cell

All the information and signalling of the serving cell are known to the UE. Thus, a simple solution without additional signaling is described as follows > The CoMP UE assumes that the PDSCH mapping is always aligned with that in the serving cell including the PDSCH starting point and the CRS RE positions. The network follows this assumption to perform PDSCH mapping for CoMP transmissions. No additional control signal is needed as the UE assumes this PDSCH mapping for the single-cell non-CoMP transmissions. However, this mutual assumption may need to be specified so that the network will follow this principle for the PDSCH mapping to allocate QAM data symbols when CoMP JT or DPS transmissions are scheduled, which is different from the single-cell non-CoMP transmissions.

For CoMP JT, if the PDCCH region (number of OFDM symbols for PDCCH) from a co-scheduled CoMP TP (other than the serving cell) is larger than that in the serving cell, with above PDSCH mapping approach, the PDSCH data symbols in the PDCCH mismatching region are only transmitted from the serving cell, i.e., non-CoMP transmissions, and will experience the interference from PDCCH signals from this co-scheduled CoMP TP. If the PDCCH region from a co-scheduled CoMP TP (other than the serving cell) is smaller than that in the serving cell, then no data will be transmitted on the PDSCH REs in the PDCCH mismatching region from the co-scheduled CoMP TP. Those REs can be muted.

For DPS CoMP scheme, if the selected TP is exactly the serving cell TP, there is no PDCCH (or PDSCH starting point) mismatch. Thus there is no spectral efficiency loss. If the PDCCH region of the selected TP is larger than that of the serving cell, the PDSCH mapping is still configured as that of the serving cell, but with the QAM symbols in the PDCCH mismatching region being punctured. Since the selected transmit TP is transparent to the UE and the UE does not have the knowledge of the QAM symbol being punctured in the PDCCH mismatching region, UE receives totally irrelevant PDCCH signals on these RE positions to decode. If the PDCCH region of the selected TP is smaller than that of the serving cell, since the UE assumes that the PDSCH mapping is aligned with that of the serving cell, the OFDM symbol or symbols after PDCCH of the selected TP that collides with the PDCCH region of the serving cell will not be used for data transmission. The network will configure the PDSCH starting point of the selected transmit TP same as that of the serving TP.

Similarly for the CRS/PDSCH collision case. For CoMP JT, on all CRS RE positions in the transmit TPs other than the serving cell, fully CoMP joint transmission among all CoMP transmit TPs cannot be achieved. Only JT on the TP subset is possible. The data symbols on these RE positions will experience the interference from the CRS transmissions in other TPs in the CoMP transmission set. For the CRS RE positions of the serving cell, no data will be transmitted from other TP in the CoMP transmit set as the UE assumes that these are the CRS. For CoMP DPS, if the selected transmit TP is different from the serving cell, the network will puncture (not to transmit) the symbols on the CRS positions of the selected transmit TP and skip the REs that are the CRS RE positions of the serving cell for the data symbols.

We can see that this approach incurs no additional signal thus has the minimum standard impact. However the spectral efficiency is low due to possible waste of resources and strong interference in the collision RE region.

3.2.2 Collision Avoidance with Semi-Static Signaling

Several methods to solve the CRS/PDSCH collision issue are summarized in [2]. Among the transparent approaches, one scheme is to transmit the data for CoMP UEs on the MBSFN subframe in which there is no CRS transmission. This restriction limits the resource utilization for CoMP transmissions. The second solution is not to transmit data at all for the CRS OFDM symbols, meaning that the entire OFDM symbol containing the CRS for any TP in the CoMP set is excluded for data transmissions in CoMP systems. Obviously this approach wastes the resources and degrades the spectral efficiency performance for CoMP. Another transparent solution is just to perform the CoMP for the TPs with the same cell ID. However, it has been agreed that CoMP transmissions can be performed for the cells with different cell IDs. Also as aforementioned, single cell ID CoMP does not solve the collision problem for the CoMP TPs with different number of antenna ports. We can see that all these approaches are not efficient. There are also some other non-transparent approaches, e.g., signaling the UE the CoMP transmission TP or TPs (for DPS or JT) so that the UE knows the active TP set and the data can be allocated to the REs without collision. Another non-transparent approach is dynamic or semi-static CRS mapping pattern signalling. These two approaches violate the agreed CoMP transparency principle in the 3GPP standardization. Also since the CoMP transmission is dynamic scheduled and UE specific, the signaling of the active CoMP TP set or CRS mapping patterns will significantly increase the DL signaling overhead.

We now provide some efficient CoMP transparent solutions to address the CRS/PDSCH collision issue. We know that in the CoMP system, the network configures and signals the UE the TP set for which UE measures the channels. Such TP set is called measurement set. The CoMP transmission TP or TPs will be selected from the measurement set. First we assume that the UE knows the number of CRS antenna ports for each TP in the measurement set and provide the following resource mapping approach.

The union of the REs allocated for CRS transmissions for the TPs in the measurement set of a CoMP UE are excluded from the resource mapping for the CoMP (JT or DPS) data transmissions in PDSCH for this UE. In other words, the resource mapping on the PDSCH for a CoMP UE can avoid any RE position that is allocated for a CRS transmission in any TP in the measurement set for this UE.

We can see that since both the network and the UE know the TPs in the measurement set, the union of the CRS RE positions are then known to both. Thus the resource mapping on an RB is known to both for transmission and detection. Also since the measurement set is usually small, the union of the CRS RE positions are less than REs on the OFDM symbols containing a CRS for any TP. Therefore, the proposed transparent approach is more efficient than the existing approaches. We can see this resource mapping is user specific. However, since the network already manages the user specific CoMP transmissions dynamically, the user specific resource mapping does not increase much complexity on the network side. Moreover, this proposed approach can be applied to both the collision cases with the different cell ID and with the same cell ID but asymmetric antenna settings. The resource mapping solutions for the examples shown in FIG. 3 and FIG. 4 are illustrated on the left portion and right portion of FIG. 6, respectively. We assume that for each example there are only two TPs in the measurement set. We can see that from the left part of FIG. 6, the union of CRS RE positions in PDSCH from two TPs with different cell ID are excluded for data mapping. On the right side, the union of the CRS RE positions excluded from the data transmission are essentially the same CRS REs for the TP with 4 CRS antenna ports. Therefore, for the TPs with the same cell ID, the solution can be rewritten as follows.

For the CoMP TPs with the same cell ID, the resource mapping for either JT or DPS CoMP data transmissions on the PDSCH for the CoMP UE is according to that of the TP with the maximum number of CRS antenna ports in the measurement set of this UE.

A variation of the proposed scheme is that the network broadcasts the CRS pattern information, which may include the cell ID and the number of CRS antenna ports, of all TPs in the CoMP cluster, the largest TP set for CoMP network. For the CoMP cluster with the same cell ID, since the cell ID is known to the UE, only the maximum number of CRS antenna ports is broadcasted to all UEs served by the CoMP cluster. Then the resource mapping for all CoMP UE is to avoid the union of the CRS RE positions for all TPs in the CoMP cluster with different cell ID, or the CRS RE positions according to the TP with the maximum number of CRS antenna ports. This approach is not UE specific, thus does not introduce additional complexity on the resource mapping on the network side. However, this approach may be only suitable for the scenario of the same cell ID CoMP as the excluded RE positions are at most the ones corresponding to the largest possible number, which is 4, of CRS antenna ports. For the CoMP cluster with different cell IDs, this approach is not efficient since the size of the CoMP cluster is usually much larger than the CoMP measurement size. With a large size of CoMP cluster, this approach might eventually exclude the any OFDM symbol which contains a CRS RE for some TP.

CRS is mainly used for LTE (release 8) UEs for channel estimation and data symbol detection. In LTE Advanced (release 10 or later) systems, a UE uses CSI-RS to estimate the channel. The UE may not monitor or detect the CRS. Thus, the UE may not be able to know the frequency shift of CRS position or the number of CRS antenna ports, consequently the CRS RE mapping pattern, for the TPs in its measurement set. For this case, we then propose the following alternatives.

- The network semi-statically signals the UE the CRS frequency shift for each TP in the measurement set and maximum number of antenna ports. The UE then assumes that the CRS pattern for each TP follows the CRS positions corresponding to the maximum number of antenna ports. The PDSCH mapping at the base station for the CoMP data transmission thus follows the same assumption of the union of CRS positions for this CoMP UE or according to the PDSCH mapping of the serving cell.
- The network semi-statically signals the UE the CRS frequency shift and the number of antenna ports for each TP in the measurement set. The UE can then obtain the CRS pattern for each TP in the measurement set. The PDSCH mapping at the base station for the CoMP data transmission thus follows the same assumption of the union of CRS positions for this CoMP UE or according to the PDSCH mapping of the serving cell
- The network semi-statically signals the UE the cell ID and the number of antenna port for each in the measurement set. The UE can then obtain the CRS pattern for each TP in the measurement set. The PDSCH mapping at the base station for the CoMP data transmission thus follows the same assumption of the union of CRS positions for this CoMP UE or according to the PDSCH mapping of the serving cell.

With the knowledge of number of CRS antenna ports, the UE knows the CRS pattern and positions. Also the CRS RE positions for less antenna ports are the subset of that for more antenna ports. Therefore, the above proposed approach is able to avoid the CRS/PDSCH collisions. Knowing the cell ID and the CRS pattern of each TP in the measurement set, the UE is able to detect CRS signal and can then perform interference cancellation to improve the receiver performance if some data are transmitted in some RE positions in the CRS/PDSCH collision region.

We now consider the data symbol sequence mapping or allocations for the proposed resource mapping with CRS/PDSCH collision avoidance. For any method with CRS/PDSCH collision avoidance, the number of REs in an RB for the CoMP data transmission will be less that that for conventional single-cell or CoMP CS/CB transmissions. Then the assigned transmission block size (TBS) can be changed corresponding to the change of available RE for data transmission to maintain the same effective data rate for the same modulation and coding scheme (MCS). However, to accommodate the change of assigned TBS for the proposed schemes for CRS/PDSCH collision avoidance, we might need to change the entire TBS table in [3] eventually which will have a large impact on the specification. Therefore, we propose the following approach. The TBS assignment still follows the same TBS table in [3] and obtain the same data symbol sequence, e.g. $S_0, S_1, \ldots$. We take the case in the FIG. 3 as the example. We first allocate the data symbol for the UE according to the data transmission on the serving cell or TP as shown in the left part of FIG. 7. For the resource mapping with CRS/PDSCH collision avoidance, as shown in the right part of FIG. 7, the network or CoMP active TP or TPs simply puncture and do not transmit the originally allocated data symbols that collides with the CRS RE positions on other TPs in the CoMP measurement set of this UE. Since the proposed resource mapping for CRS/PDSCH collision avoidance does not exclude many REs for data transmission, the slight increase of the final effective information rate will have nearly no impact on the receiver performance.

Figure 8:
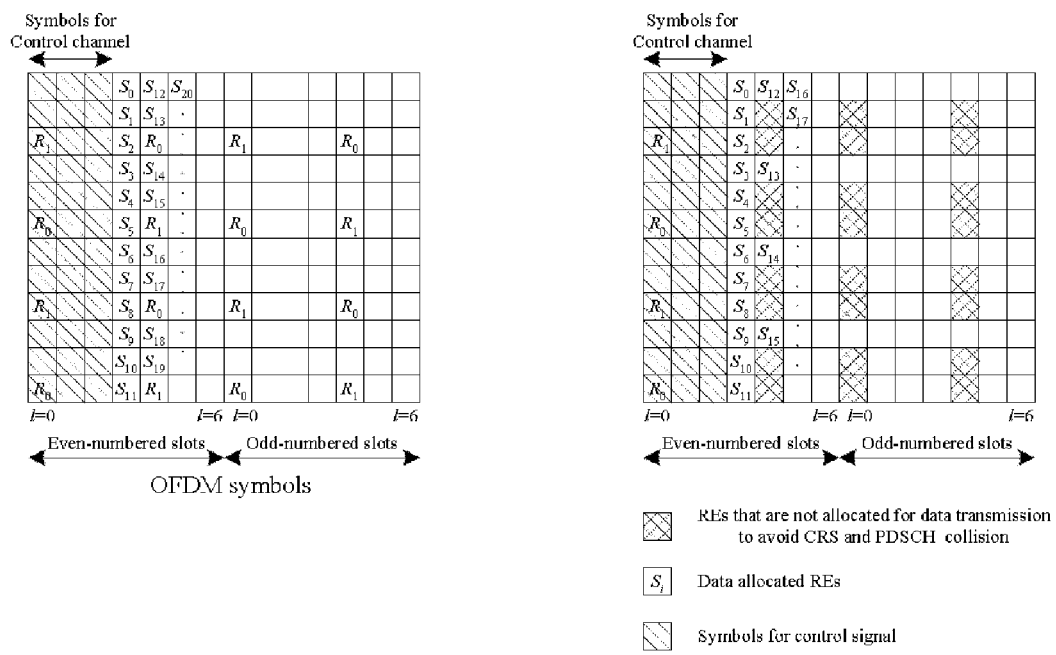
FIG. 8 depicts data symbol allocations for CRS/PDSCH collision avoidance. Left: Original data symbol allocation assuming the serving TP single cell transmissions. Right: Data symbol allocations for CoMP transmissions (JT or DPS) with CRS/PDSCH collision avoidance, method 2.

The alternative approach is shown on the right portion of FIG. 8, in which the network sequentially allocates the data symbols to the REs without placing any symbol on the collided RE. Then with this approach, some data symbols at the end of symbol sequence will not be allocated or transmitted. Although the final effective information rate is the same as that in the previous approach, due to sub-block interleaving, puncturing consecutive data symbols at the end of sequence may incur relatively larger performance degradation.

Moreover, the PDSCH starting point can also be signalled to the UE in a semi-static manner. We then have the following alternatives.

- The network semi-statically informs the UE the union of the CRS RE positions in the CoMP measurement set of the UE. The network also semi-statically configures and signals the UE the starting point of the PDSCH. The network then configures the QAM symbol to PDSCH RE mapping from the configured semi-static PDSCH starting point. Then network either follows the serving cell CRS pattern for the sequential QAM symbol to PDSCH RE mapping or perform the QAM symbol to PDSCH RE mapping sequentially to avoid the union of CRS positions in the CoMP measurement set.
- The network semi-statically informs the UE either the frequency shift of CRS position or the cell ID, and the number of antenna ports for each TP in the CoMP measurement set of the UE. The network also semi-statically configures and signals the UE the starting point of the PDSCH. The network then configures the QAM symbol to PDSCH RE mapping according to the semi-statically configured PDSCH starting point. And the network either follows the serving cell CRS pattern for the sequential QAM symbol to PDSCH RE mapping or configures the QAM symbol to PDSCH RE mapping sequential to avoid the union of CRS positions in the CoMP measurement set.
- The network semi-statically informs the UE either the frequency shift of CRS position or the cell ID, and the number of antenna ports for each TP in the CoMP measurement set of the UE. The network also semi-statically configures and signals the UE the starting point of PDSCH and which CRS pattern for the PDSCH mapping. The network then configures the QAM symbol to PDSCH RE mapping according to the semi-statically configured PDSCH starting point and the sequential PDSCH mapping according to the configured CRS pattern or TP for PDSCH mapping.

3.2.3 Dynamic Signaling of the PDSCH Mapping

To improve the CoMP performance, the PDSCH mapping information including the starting point and CRS pattern can be dynamically conveyed to the UE. We then list the following alternatives to achieve this goal with small signal overhead.

- The network semi-statically informs the UE either the frequency shift of CRS position or the cell ID, and the number of antenna ports for each TP in the CoMP measurement set of the UE. Then the network dynamically signals the UE the PDSCH starting point that will be configured for the PDSCH mapping. The network then configures the QAM symbol to PDSCH RE mapping from the configured PDSCH starting point. And the network either follows the serving cell CRS pattern for the sequential QAM symbol to PDSCH RE mapping or configures the QAM symbol to PDSCH RE mapping sequential to avoid the union of CRS positions in the CoMP measurement set.

The network semi-statically informs the UE either the frequency shift of CRS position or the cell ID, and the number of antenna ports for each TP in the CoMP measurement set of the UE. The network also semi-statically signals the UE which TP or which CRS pattern for the PDSCH mapping. Then the network dynamically signals the UE the PDSCH starting point that will be configured for the PDSCH mapping. The network then configures the QAM symbol to PDSCH RE mapping starting from the dynamically configured PDSCH starting point and the sequential PDSCH mapping according to the semi-statical configured CRS pattern or TP for PDSCH mapping.

The network semi-statically informs the UE either the frequency shift of CRS position or the cell ID, and the number of antenna ports for each TP in the CoMP measurement set of the UE. Then the network dynamically signals the UE the PDSCH starting point that will be configured for the PDSCH mapping and which TP or which CRS pattern for the PDSCH mapping. The CRS pattern for the PDSCH can be dynamically conveyed to the UE with the indices of the TPs or the CRS patterns in the CoMP measurement set that have been semi-statically signalled to the UE. The network then configures the QAM symbol to PDSCH RE mapping starting from the dynamically configured PDSCH starting point and the sequential PDSCH mapping according to the dynamic configured CRS pattern or TP for PDSCH mapping.

4 Interference Measurement

For CQI feedback, the UE can compute the SINR based on a certain assumption on the interference. For single-cell transmissions, the SINR is computed under single-point transmission hypothesis by assuming all other TPs are interfering sources. However, for CoMP, different assumptions on the interference may have to be made depending on the CoMP transmission scheme. For example, for JT, the interference is from the TPs outsides the JT TP set. But for CB/CS, DPS, and the conventional single-cell transmissions, the interference is from all TPs other than the actual transmission TP for this UE. To support all CoMP schemes, a common signaling structure for the interference measurement for different assumptions has to be efficiently designed. We now tackle this problem and propose our solutions next.

4.1 Signal Model

We now consider the following signal model for interference measurement. The received signal corresponding to an interference measurement sample can be written as $$y_t = \sum_{i=1}^{M} \beta_{it} H_i W_i s_{it} + \tilde{H}\tilde{W}\tilde{s}_t + n_t.$$ (8)

where t is a sample point on a resource element (RE) which is the smallest time-frequency resource unit, $\beta_{it} \in \{0, 1\}$ and $\beta_{it}=0$ denotes that TP i is muted (or silent) or equivalently is transmitting zero-power CSI-RS. Note that in case TP i sends nonzero-power CSI-RS on that resource element we can sill use the above signal model with $\beta_{it}=0$ after estimating the channel from TP i and canceling the contribution of its RS and assuming perfect cancelation. In this sense nonzero-power CSI-RS sent from a TP on an RE is equivalent to zero-power CSI RS sent by that TP on that RE. We assume that the channel and precoding matrix for all TPs, consequently, the interference covariances, do not change in the measurement range of t. Here we absorb transmit power $\rho_i/r_i$ to the channel matrix $H_i$ for notation simplicity.

Since $E\{s_{it}s_{it}^\dagger\}=I$, $E\{\tilde{s}_t\tilde{s}_t^\dagger\}=I$, and $E\{n_t n_t^\dagger\}=I$, we have $$R_i \triangleq E\{H_i W_i s_{it} s_{it}^\dagger W_i^\dagger H_i^\dagger\} = H_i W_i W_i^\dagger H_i^\dagger \quad (9)$$

$$\tilde{R} \triangleq E\{\tilde{H}\tilde{W}\tilde{s}_t \tilde{s}_t^\dagger \tilde{W}^\dagger \tilde{H}^\dagger\} = \tilde{H}\tilde{W}\tilde{W}^\dagger \tilde{H}^\dagger \quad (10)$$

$$R = \tilde{R} + I. \quad (11)$$

We now consider the design of pattern of $\beta_{it}$ for interference measurement for CoMP. For each RE location, we define a muting vector $\beta_t = [\beta_{1t}, \ldots, \beta_{Mt}]$ which specifies if the TPs in the CoMP cluster need to mute RE or not on this RE location.

4.2 Implicit Scheme

First we consider the signaling for the implicit interference measurement. The designed muting pattern follows the principles outlined below. For any CoMP UE in the CoMP cluster or network, the following points can be satisfied:

If one TP sends non-zero power CSI-RS in an RE, then all the REs corresponding to all the other TPs in the CoMP measurement set, mapping to the same time and frequency location are muted or transmitted with zero-power CSI-RS.

Optionally, for one or more RE locations on which there is no non-zero power CSI-RS sent from any TP in the CoMP measurement set, the REs on this location corresponding to all TPs in the CoMP measurement set may be muted together or transmitted with zero-power CSI-RS.

Figure 9:
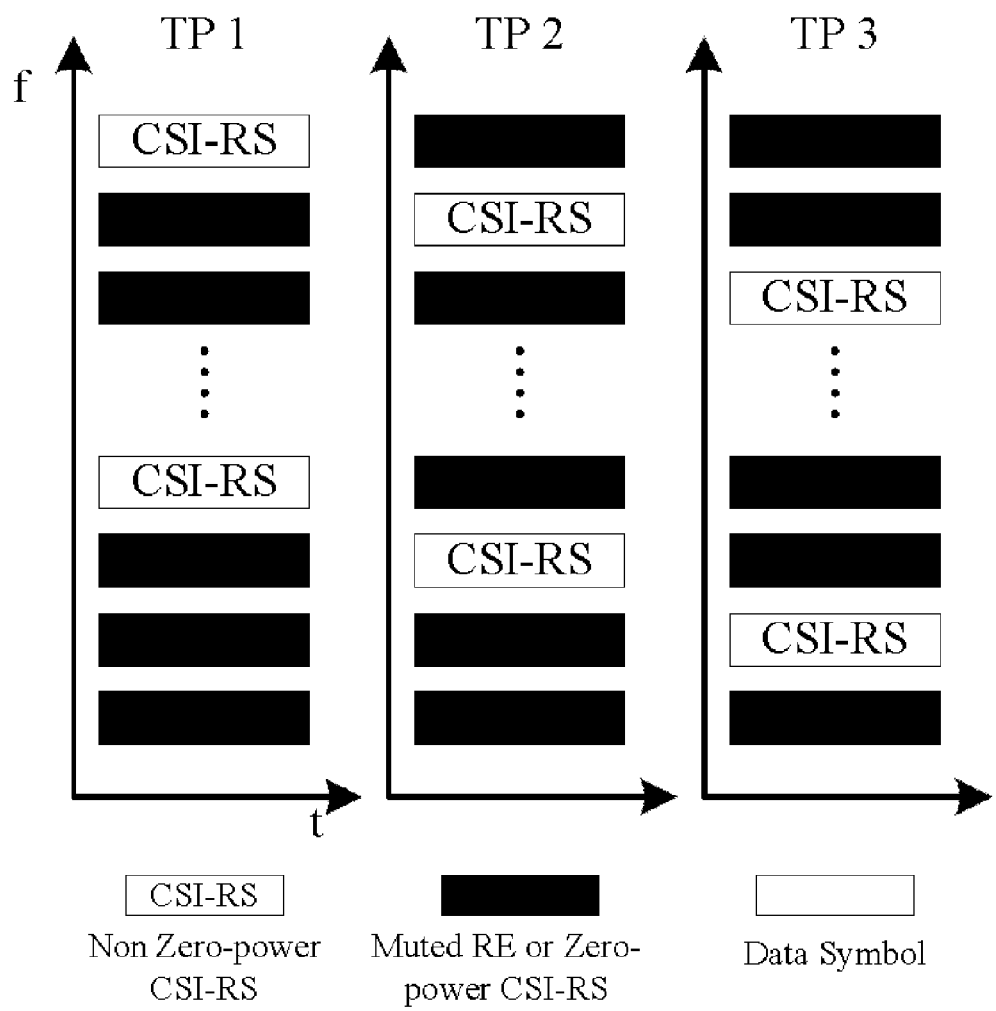
FIG. 9 depicts a reference signal structure for interference measurement for CoMP (implicit scheme).

The above approach is shown in FIG. 9. We can see with this approach, we have $\beta_{it}=0$ for any $i \in v$ on the predetermined sample points. The UE can then measure the interference outside CoMP set R. To take into account the interference from other TPs in the CoMP set, we can obtain the interference implicitly as follows by assuming that a scaled identity precoder is employed on every interfering TP, given by $$\hat{R} = \sum_{i \in V_{int}} \delta_i H_i H_i^\dagger + R, \quad (12)$$

where $v_{int}$ is the set of interfering TPs in the CoMP set. The scaling factors $\{\delta_i\}$ can be user and TP specific and can be conveyed by the network to the UE in a semi-static manner. Alternatively, the UE may be configured by the network to assume that the interference from TP i will fall in a subspace orthogonal to the PMI $\hat{V}_i$ it has determined based on its estimate of the channel it sees from TP i. Then, it can obtain the interference implicitly as follows $$\hat{R} = \sum_{i \in V_{int}} \delta_i H_i (I - \hat{V}_i \hat{V}_i^\dagger) H_i^\dagger + R, \quad (13)$$

Note that the above formula is equivalent to assuming the signal from TP i to be uniformly distributed in the span of the projection $(I - \hat{V}_i \hat{V}_i^\dagger)$. The UE can instead determine and use an interference covariance matrix determined by taking an average over vectors or matrices that lie in a pre-determined codebook and the subspace orthogonal to the PMI $\hat{V}_i$.

4.3 Explicit Scheme

Usually, the precoders employed from the interfering TPs are not identity matrix. Thus, there will be an inherent error for the implicit measurement scheme. We now propose the following signaling structure assuming explicit interference measurement.

- All the muted REs and/or zero-power CSI-RSs are positioned in a pre-defined pattern. Several patterns can be specified and the pattern index can be broadcasted to all UEs in the CoMP set.
- The pattern can be designed so that all the UEs can obtain all the desired covariance components for the intra-CoMP set interferences
- The RE locations on which the data symbol are transmitted from all CoMP TPs can also be utilized to measure the total covariance.

The idea above is to form one or several muting patterns that the network controller can configure so that all the UEs can measure their desired interference covariance components $R_i$ and R, or their combinations. We now present a pattern example for M=3 is shown in the upper portion of FIG. 10. The nonzero-power CSI-RSs are intended for channel estimation. However, with a fairly accurate channel estimation, we can cancel out the CSI-RS signal and the residual can be used for the interference estimation. So in this sense, the nonzero-power CSI-RS can be treated as a muting RE for interference measurement. Due to sparse property of non-zero-power CSI-RS allocations. Muting on other RE positions from different TPs may be necessary for interference measurement. As shown in the upper portion of FIG. 10, we mute the RE or allocate zero-power CSI-RS resources in the same way as that for placing the nonzero-power CSI-RS resources but on the other RE locations. We can see this can form a muting pattern. With this pattern, we can group the samples which has the same interference components and obtain the estimates of $Y_1=R_1+R_2+R$, $Y_2=R_1+R_3+R$, $Y_3=R_2+R_3+R$, and $Y_4=R_1+R_2+R_3+R$, which can be written as $$\begin{bmatrix} Y_1 \\ Y_2 \\ Y_3 \\ Y_4 \end{bmatrix} = \underbrace{\begin{bmatrix} 1 & 1 & 0 & 1 \\ 1 & 0 & 1 & 1 \\ 0 & 1 & 1 & 1 \\ 1 & 1 & 1 & 1 \end{bmatrix}}_{A} \begin{bmatrix} R_1 \\ R_2 \\ R_3 \\ R \end{bmatrix}, \quad (14)$$

If $Y_i$, i=1, ..., 4 can be ideally estimated, we can solve the equation to obtain each covariance component, $R_i$, i=1, ..., 3 and R. If we design a muting pattern so that the above coefficient matrix A has a rank of M+1, we can then solve the equation and obtain any combination of interference covariance components.

We can see that the A can form some kind of basis for a muting pattern. All the sample points can have the muting for one RE position from different TPs in the CoMP cluster defined by one row of A by excluding the last entry 1. With this, we now define a base RE muting pattern as follows. A base RE muting pattern contains the maximal number of muting vectors for all interference measure samples so that for each muting vector specifying the TP on an RE position are distinct from other muting vecto. Mathematically, we define a base muting pattern as a set $\mathcal{B}$ of $b_j \triangleq [b_{1j}, \ldots, b_{Mj}]$, $b_{i,j} \in \{0,1\}$ so that $\forall b_j, b_{j'} \in \mathcal{B}$ and $j \neq j'$, we have $b_j \neq b_{j'}$. The final muting REs for one sample point simply follows one element in $\mathcal{B}$, i.e., $\beta_t = b_j \in \mathcal{B}$. With J elements in the base muting pattern set, $b_j$, j=1, ..., J, we form the final coefficient matrix B by $$B = \begin{bmatrix} b_1 & 1 \\ b_2 & 1 \\ \vdots & \vdots \\ b_J & 1 \end{bmatrix}. \quad (15)$$

We can see that to make sure that the final coefficient matrix B has a rank of M+1, there should be at least M+1 elements in B, i.e., J≥M+1. Moreover, there should be at least a total of M muting REs, i.e., M zeros in B. Therefore, we can design a pattern to have a minimum number of muting REs to reduce the throughput loss due to muting REs. Practically, based on the tradeoff between throughput efficiency and interference measurement accuracy, we can design a base pattern to have more muting REs. We may have several base patterns so that the system can configure one pattern semi-statically based on the UEs' preferences of CoMP schemes. Given two base patterns, $B_1$ and $B_2$, (or $\mathcal{B}_1$ and $\mathcal{B}_2$) if one can be transformed to another with column permutation, we say that they are the same base pattern the order of TPs does not change the muting pattern. Although the base pattern does not change with column permutation, the permutation may be defined and specified if a element $b_j$ does not result in another element in 13 with the column permutation. If the types of interference covariance measurements for all UEs in the CoMP cluster are less than M+1, we can form a muting base pattern with less components. One simple way to achieve that is to use a subset of $\mathcal{B}$ with rank M+1.

With the defined base pattern, the muting pattern for one RB or RBG can be formed with select and place the muting vector from the base pattern set on an RE position in predetermined way.

Figure 10:
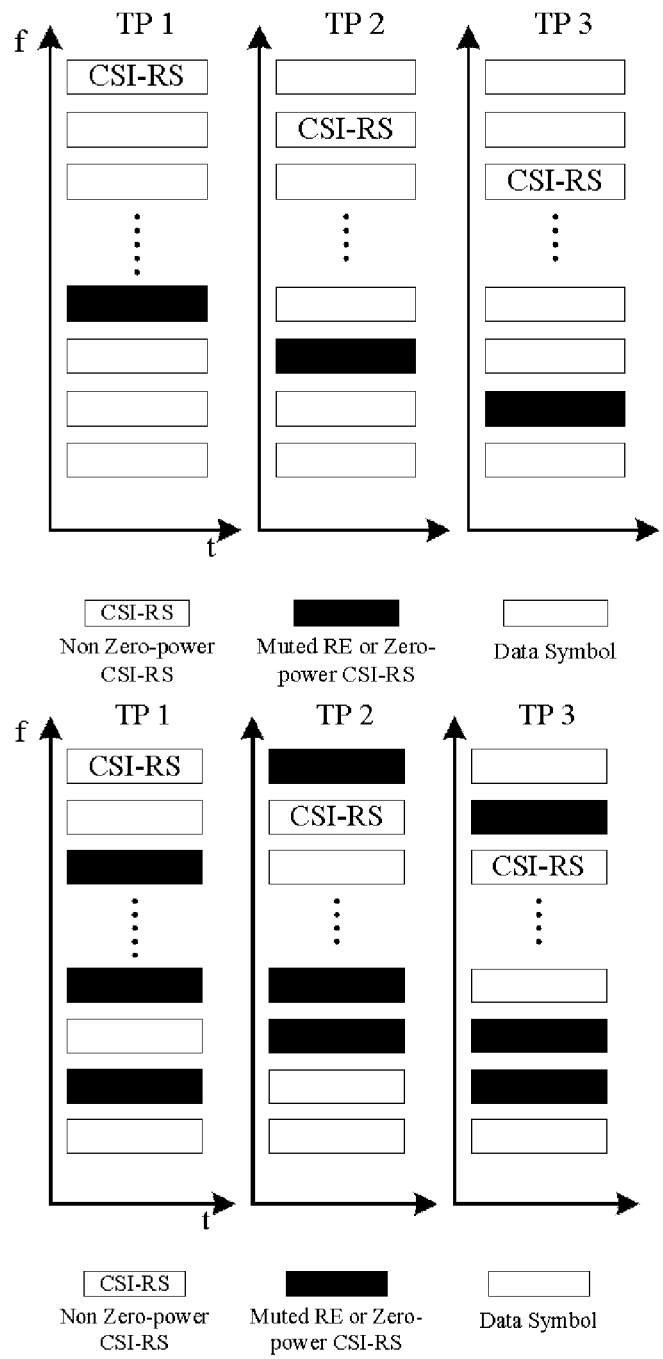
FIG. 10 depicts two reference signal structure examples for interference measurement for CoMP (explicit scheme).

Also since the nonzero-power CSI-RSs can be necessary for the channel estimation and they can also be treated as zero-power CSI-RS or a muting RE for the interference measurement, it may be better to including the muting of the RE position where nonzero-power CSI-RS is placed as one muting vector in the base pattern. In both examples shown in FIG. 10 the muting base pattern is specified like this. The base pattern for the example in the lower part of FIG. 10 is then $\mathcal{B} = \{[001], [100], [101], [111]\}$.

Since the estimation error for interference covariance components may propagate with arithmetic calculation, it is better to have the same number of samples for each element $b_j$. The other issue is that since we have limited samples, we are not be able to approach true value of $R_i$ and R, the solutions in (14) may not be positive semi-definite so we may need to determine and use the closest positive semi-definite approximations.

Figure 11:
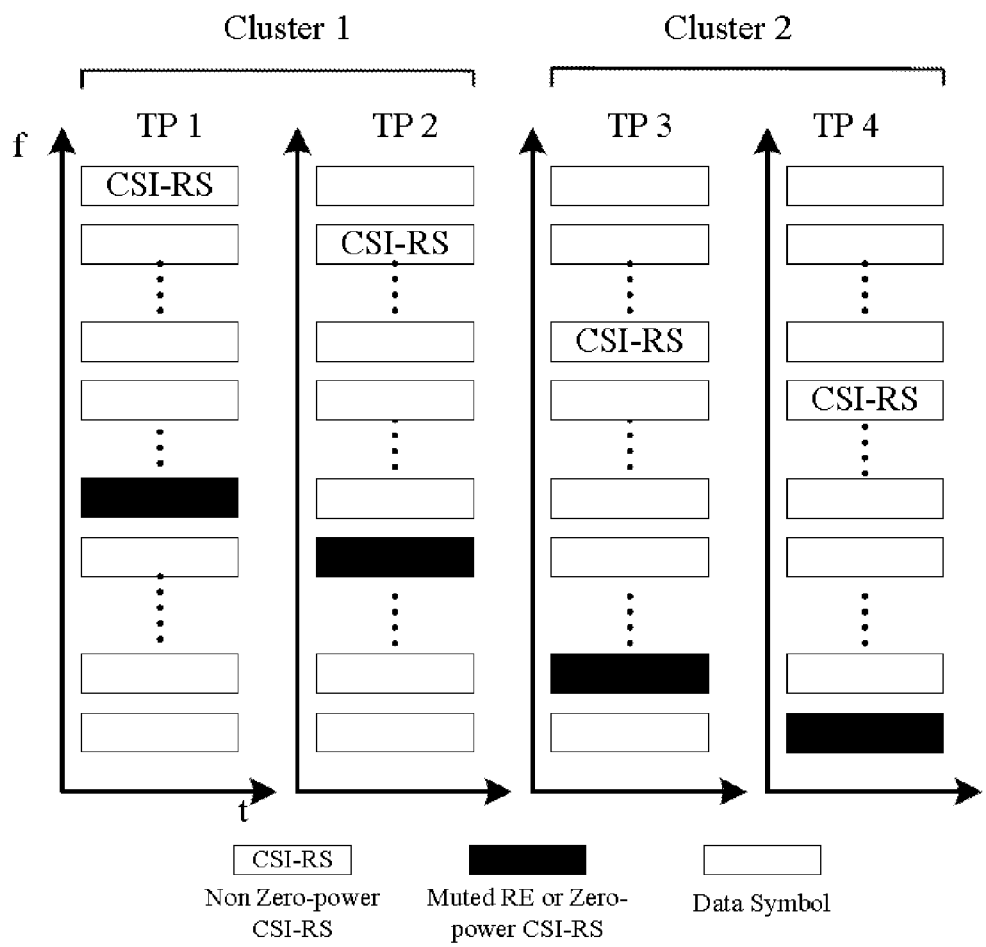
FIG. 11 depicts a reference signal structure for interference measurement with subclustering (explicit scheme).

Next, we note that it may be beneficial to group the CoMP cluster TPs into several sub-clusters, where each sub-cluster contains one or more TPs and any two such sub-clusters are non-overlapping in terms of TPs. Then each CoMP UE is associated to one sub-cluster which includes all the TPs in its CoMP set. This is beneficial in many instances where UEs are concentrated around distinct groups of TPs all within the CoMP cluster. Then the interference measurement requirement for the UEs under the same sub-cluster may utilize the same pattern. For each sub-cluster, we use the base pattern that depends on the sub-cluster size along with a certain randomization, e.g., a configurable cyclic shift so that there is no collision on the zero-power CSI-RS or muted REs among any two sub-clusters in the cluster in order to avoid the inaccurate interference measurement. An example is shown in FIG. 11. The benefit of this approach is that we can employ base-patterns that are dependent on sub-cluster size instead of using one base-pattern that is designed for the whole CoMP cluster. Note that a UE associated to a sub-cluster do not have any TP belonging to any other sub-cluster in its respective CoMP set. Thus it does not need to separately measure the covariance matrix corresponding to that TP or the interference from that TP (indeed this interference can be included as part of its out of CoMP set interference by that UE). This reduces the number of muting REs that are needed over the whole CoMP cluster. As an option, in order to simplify UE interference estimation implementation as well as reduce UE memory overhead, the patterns used by sub-clusters could have a nested structure, i.e, the pattern of a sub-cluster of larger size can include that of a sub-cluster of smaller size.

Figure 12:
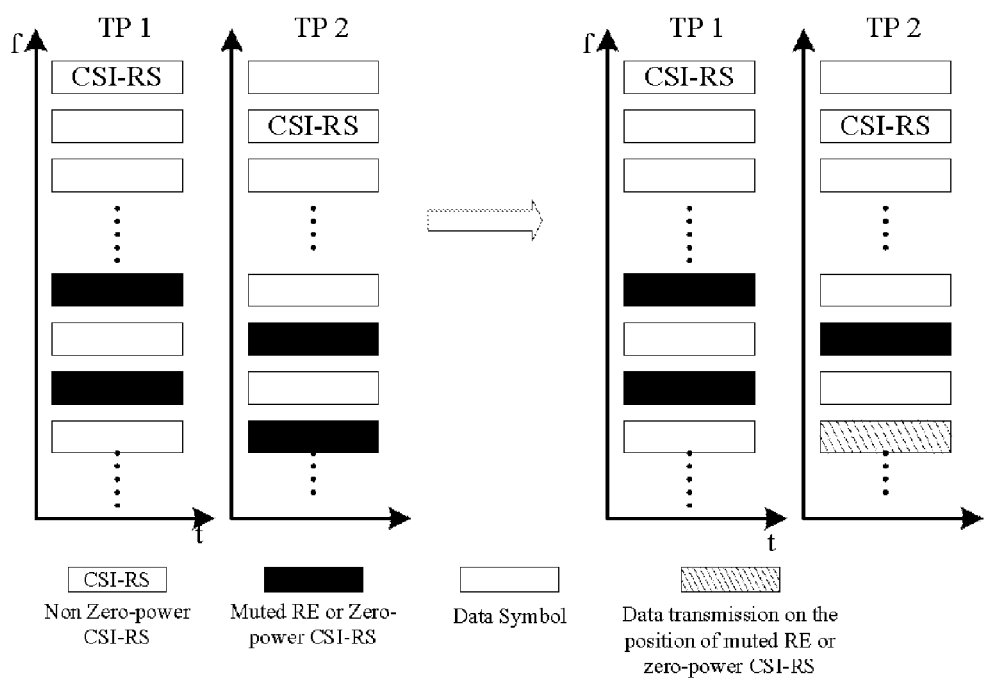
FIG. 12 depicts a reference signal structure for interference measurement with subsampling (explicit scheme).

For each base pattern, we can also define additional sub-sampled patterns so that some muted REs are replaced with data carrying REs in order to reduce the overhead. The reason for doing this is because in some instances a TP belonging to a cluster or sub-cluster may be in the CoMP set of only a few UEs compared to the other TPs in that cluster or sub-cluster. Then for most UEs associated with that cluster or sub-cluster that TP is an out of CoMP set interferer and does not need to be muted for their interference measurement. Thus, it is sensible to have such a TP muted for fewer REs. This can be achieved by defining one or more sub-sampling factors. Each sub-sampling factor for a TP identifies which among all muted REs for that TP defined in the base pattern should be retained as muted REs for that TP. The REs not retained are used for data transmission by that TP. Note that an un-muting sequence identified by the sub-sampling factor can be employed for this purpose. In this way the network can in a semi-static manner convey to all users associated with a cluster or sub-cluster the sub-sampling factor to be assumed for each TP in that cluster or sub-cluster, respectively. This approach gives the network enough flexibility in terms of using different patterns without significantly increasing the signaling overhead. Notice also that since the sub-sampled patterns are contained in their respective base-patterns the UE implementation is simplified. An example is illustrated in FIG. 12.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method implemented in a mobile communications network supporting coordinated multiple point transmission and reception (CoMP), the method comprising:
transmitting, to a user equipment (UE), data in a physical downlink shared channel (PDSCH);
transmitting a reference signal to the UE; and
signalling reference signal configurations semi-statically,
wherein a union of resource elements (REs) allocated for reference signals configured with a measurement set of a plurality of configurations are excluded from resource mapping for transmitting the data to the UE,
wherein the reference signal configurations comprise reference signal RE mapping pattern, and
wherein the reference signal RE mapping pattern includes a frequency shift of reference signal position for each of the measurement of the plurality of configurations, the number of reference signal antenna ports for each of the measurement of the plurality of configurations, a maximum number of reference signal antenna ports, and a cell identity (cell ID) value.

2. The method as in claim 1,
wherein the resource mapping is UE-specific.

3. The method as in claim 1,
wherein the reference signals comprise cell-specific reference signals (CRS's).

4. The method as in claim 1,
wherein each of the plurality of configurations is transmitted from either a macro-cell base station (BS) or a low power remote radio head (RRH).

5. The method as in claim 1,
wherein the plurality of configurations have different cell identity (cell ID) values.

6. The method as in claim 1,
wherein the plurality of configurations have the same cell identity (cell ID) value and asymmetric antenna settings.

7. The method as in claim 6,
wherein the union of REs for joint transmission (JT) or dynamic point selection (DPS) is made according to transmission points (TPs) with a maximum number of reference signal antenna ports in the measurement of the plurality of configurations.

8. The method as in claim 1, further comprising:
broadcasting reference signal pattern information including at least one of a cell identity (cell ID) value and the number of reference signal antenna ports of at least one of the plurality of configurations.

9. A method implemented in a transmission point (TP) supporting coordinated multiple point transmission and reception (CoMP), the method comprising:
transmitting, to a user equipment (UE), data in a physical downlink shared channel (PDSCH);
transmitting a reference signal to the UE; and
signalling reference signal configurations semi-statically,
wherein a union of resource elements (REs) allocated for reference signals configured with a measurement set of a plurality of configurations are excluded from resource mapping for transmitting the data to the UE,
wherein the reference signal configurations comprise reference signal RE mapping pattern, and
wherein the reference signal RE mapping pattern includes a frequency shift of reference signal position for each of the measurement of the plurality of configurations, the number of reference signal antenna ports for each of the measurement of the plurality of configurations, a maximum number of reference signal antenna ports, and a cell identity (cell ID) value.

10. A mobile communications network supporting coordinated multiple point transmission and reception (CoMP), the mobile communications network comprising:
a user equipment (UE); and
a transmission point (TP) to transmit, to the UE, data in a physical downlink shared channel (PDSCH), to transmit a reference signal to the UE, and to signal reference signal configurations semi-statically,
wherein a union of resource elements (REs) allocated for reference signals configured with a measurement set of a plurality of configurations are excluded from resource mapping for transmitting the data to the UE,
wherein the reference signal configurations comprise reference signal RE mapping pattern, and wherein the reference signal RE mapping pattern includes a frequency shift of reference signal position for each of the measurement of the plurality of configurations, the number of reference signal antenna ports for each of the measurement of the plurality of configurations, a maximum number of reference signal antenna ports, and a cell identity (cell ID) value.

11. A transmission point (TP) supporting coordinated multiple point transmission and reception (CoMP), the TP comprising:
a first transmission unit to transmit, to a user equipment (UE), data in a physical downlink shared channel (PDSCH);
a second transmission unit to transmit a reference signal to the UE; and
a third transmission unit to signal reference signal configurations semi-statically,
wherein a union of resource elements (REs) allocated for reference signals configured with a measurement set of a plurality of configurations are excluded from resource mapping for transmitting the data to the UE,
wherein the reference signal configurations comprise reference signal RE mapping pattern, and
wherein the reference signal RE mapping pattern includes a frequency shift of reference signal position for each of the measurement of the plurality of configurations, the number of reference signal antenna ports for each of the measurement of the plurality of configurations, a maximum number of reference signal antenna ports, and a cell identity (cell ID) value.

* * * * *